US012724831B2

(12) United States Patent
Wang

(10) Patent No.: US 12,724,831 B2
(45) Date of Patent: Sep. 1, 2026

(54) SEGMENT-SPECIFIC SHARED DATA INHERITANCE DETERMINATION

(71) Applicant: Ancestry.com DNA, LLC, Lehi, UT (US)

(72) Inventor: Yong Wang, Foster City, CA (US)

(73) Assignee: Ancestry.com DNA, LLC, Draper, UT (US)

( * ) Notice: Subject to any disclaimer, the term of this patent is extended or adjusted under 35 U.S.C. 154(b) by 12 days.

(21) Appl. No.: 18/241,821

(22) Filed: Sep. 1, 2023

(65) Prior Publication Data

US 2024/0078265 A1 Mar. 7, 2024

Related U.S. Application Data

(60) Provisional application No. 63/403,300, filed on Sep. 2, 2022.

(51) Int. Cl.
*G06F 16/903* (2019.01)
*G06F 16/906* (2019.01)

(52) U.S. Cl.
CPC ...... *G06F 16/90344* (2019.01); *G06F 16/906* (2019.01)

(58) Field of Classification Search
CPC ......................... G06F 16/90344; G06F 16/906
See application file for complete search history.

(56) References Cited

U.S. PATENT DOCUMENTS 6,570,567 B1 5/2003 Eaton
7,062,752 B2 6/2006 Simpson et al.
7,249,129 B2 7/2007 Cookson et al.
7,818,281 B2 10/2010 Kennedy et al.
8,510,057 B1 8/2013 Avey et al.
8,769,438 B2 7/2014 Mangum et al.
(Continued)

FOREIGN PATENT DOCUMENTS

CN 106846029 A 6/2017
WO WO 2012/099890 A1 7/2012
(Continued)

OTHER PUBLICATIONS

23ANDME. "Ancestry Composition: 23andMe's State-of-the-Art Geographic Ancestry Analysis." 23andme.com, Sep. 5, 2015, 10 pages, [Online] [Retrieved Jan. 26, 2024], Retrieved from the Internet Archive <URL:https://web.archive.org/web/20150905120544/https://www.23andme.com/ancestry_composition_guide/>.
(Continued)

*Primary Examiner* — Charles Rones
*Assistant Examiner* — Mohammad S Bhuyan
(74) *Attorney, Agent, or Firm* — Fenwick & West LLP

(57) ABSTRACT

A computing server may receive a target data instance. The computing server may scan through a data store to identify a related data instance that shares one or more matched data strings with the target data instance. The computing server may determine one or more windows of data locality to which the one or more matched data strings belong. The computing server may determine one or more data group labels for the one or more windows of data locality that includes the one or more matched data strings. The computing server may store data group information of the matched data strings between the target data instance and the related data instance.

20 Claims, 7 Drawing Sheets

(56) References Cited

U.S. PATENT DOCUMENTS

| | | | |
|---|---|---|---|
| 9,116,882 | B1 | 8/2015 | Macpherson et al. |
| 9,213,944 | B1 | 12/2015 | Do et al. |
| 9,213,947 | B1 | 12/2015 | Do et al. |
| 9,336,177 | B2 | 5/2016 | Hawthorne et al. |
| 9,367,800 | B1 | 6/2016 | Do et al. |
| 9,836,576 | B1 | 12/2017 | Do et al. |
| 9,864,835 | B2 | 1/2018 | Avey et al. |
| 9,910,962 | B1 | 3/2018 | Fakhrai-Rad et al. |
| 9,940,433 | B2 | 4/2018 | Han et al. |
| 10,114,922 | B2 | 10/2018 | Byrnes et al. |
| 10,223,498 | B2 | 3/2019 | Han et al. |
| 10,347,365 | B2 | 7/2019 | Wong et al. |
| 10,354,745 | B2 | 7/2019 | Wong et al. |
| 10,558,930 | B2 | 2/2020 | Noto et al. |
| 10,679,729 | B2 | 6/2020 | Ball et al. |
| 10,692,587 | B2 | 6/2020 | Song et al. |
| 10,720,229 | B2 | 7/2020 | Barber et al. |
| 11,211,149 | B2 | 12/2021 | Curtis et al. |
| 11,232,854 | B2 | 1/2022 | Anderson et al. |
| 2002/0019746 | A1 | 2/2002 | Rienhoff et al. |
| 2002/0143578 | A1 | 10/2002 | Cole et al. |
| 2002/0156596 | A1 | 10/2002 | Caruso et al. |
| 2003/0059808 | A1 | 3/2003 | Liu et al. |
| 2003/0101000 | A1 | 5/2003 | Bader et al. |
| 2003/0113727 | A1 | 6/2003 | Girn et al. |
| 2003/0172065 | A1 | 9/2003 | Sorenson et al. |
| 2004/0083226 | A1 | 4/2004 | Eaton |
| 2004/0093334 | A1 | 5/2004 | Scherer |
| 2004/0126840 | A1 | 7/2004 | Cheng et al. |
| 2004/0267458 | A1 | 12/2004 | Judson et al. |
| 2005/0025508 | A1 | 2/2005 | Karakama et al. |
| 2005/0089852 | A1 | 4/2005 | Lee et al. |
| 2005/0147947 | A1 | 7/2005 | Cookson et al. |
| 2005/0164704 | A1 | 7/2005 | Winsor |
| 2005/0164705 | A1 | 7/2005 | Rajkotia et al. |
| 2005/0192008 | A1 | 9/2005 | Desai et al. |
| 2005/0255508 | A1 | 11/2005 | Casey et al. |
| 2007/0050354 | A1 | 3/2007 | Rosenberg |
| 2007/0260599 | A1 | 11/2007 | McGuire et al. |
| 2008/0027656 | A1 | 1/2008 | Parida |
| 2008/0040046 | A1 | 2/2008 | Chakraborty et al. |
| 2008/0081331 | A1 | 4/2008 | Myres et al. |
| 2008/0082955 | A1 | 4/2008 | Andreessen et al. |
| 2008/0113727 | A1 | 5/2008 | Vallejo et al. |
| 2008/0154566 | A1 | 6/2008 | Myres et al. |
| 2008/0162510 | A1 | 7/2008 | Baio et al. |
| 2008/0228043 | A1 | 9/2008 | Kenedy et al. |
| 2008/0255768 | A1 | 10/2008 | Martin et al. |
| 2009/0030985 | A1 | 1/2009 | Yuan |
| 2010/0256917 | A1 | 10/2010 | McVean et al. |
| 2012/0054190 | A1 | 3/2012 | Peters |
| 2012/0130983 | A1* | 5/2012 | Ryan ................. G06F 16/90344 707/715 |
| 2012/0191903 | A1 | 7/2012 | Araki et al. |
| 2012/0283108 | A1 | 11/2012 | Sampas |
| 2013/0085728 | A1 | 4/2013 | Tang et al. |
| 2013/0149707 | A1 | 6/2013 | Sorenson et al. |
| 2013/0163860 | A1 | 6/2013 | Suzuki et al. |
| 2013/0297221 | A1 | 11/2013 | Johnson et al. |
| 2014/0045705 | A1 | 2/2014 | Bustamante et al. |
| 2014/0045708 | A1 | 2/2014 | Feng et al. |
| 2014/0067355 | A1 | 3/2014 | Noto et al. |
| 2014/0082568 | A1 | 3/2014 | Hulet et al. |
| 2014/0108527 | A1 | 4/2014 | Aravanis et al. |
| 2014/0194300 | A1 | 7/2014 | Song et al. |
| 2014/0278138 | A1 | 9/2014 | Barber et al. |
| 2015/0106115 | A1 | 4/2015 | Hu et al. |
| 2016/0026755 | A1 | 1/2016 | Byrnes et al. |
| 2016/0350479 | A1 | 12/2016 | Han et al. |
| 2017/0017752 | A1 | 1/2017 | Noto et al. |
| 2017/0062577 | A1 | 3/2017 | Brewer et al. |
| 2017/0213127 | A1 | 7/2017 | Duncan |
| 2017/0220738 | A1 | 8/2017 | Barber et al. |
| 2017/0262577 | A1 | 9/2017 | Ball et al. |
| 2017/0277827 | A1 | 9/2017 | Granka et al. |
| 2017/0329904 | A1 | 11/2017 | Naughton et al. |
| 2018/0329033 | A1 | 11/2018 | Pratt et al. |
| 2018/0330824 | A1 | 11/2018 | Athey et al. |
| 2019/0114219 | A1 | 4/2019 | Do et al. |
| 2019/0139623 | A1 | 5/2019 | Bryc et al. |
| 2020/0005899 | A1 | 1/2020 | Nicula et al. |
| 2020/0058368 | A1* | 2/2020 | Nguyen ................... G06N 5/02 |
| 2020/0082903 | A1 | 3/2020 | Song et al. |
| 2020/0082905 | A1 | 3/2020 | Song et al. |
| 2020/0082909 | A1 | 3/2020 | Wang et al. |
| 2020/0099614 | A1* | 3/2020 | Vutharkar ................. G06F 7/14 |
| 2020/0160202 | A1 | 5/2020 | Noto et al. |
| 2020/0273542 | A1* | 8/2020 | Song ...................... G16B 40/20 |
| 2020/0286579 | A1 | 9/2020 | Song et al. |
| 2020/0380160 | A1* | 12/2020 | Kraus ................... G06F 21/577 |
| 2021/0042304 | A1* | 2/2021 | Lei ...................... G06F 16/2465 |
| 2021/0090694 | A1* | 3/2021 | Colley ................... G16B 30/00 |
| 2021/0134387 | A1 | 5/2021 | McMaster-Schraiber et al. |

FOREIGN PATENT DOCUMENTS

| | | | |
|---|---|---|---|
| WO | WO 2014/145280 | A1 | 9/2014 |
| WO | WO 2014/151088 | A2 | 9/2014 |
| WO | WO 2015/051006 | A2 | 4/2015 |
| WO | WO 2016/061260 | A1 | 4/2016 |
| WO | WO 2016/061568 | A1 | 4/2016 |
| WO | WO 2018/129413 | A1 | 7/2018 |
| WO | WO 2020/053789 | A1 | 3/2020 |

OTHER PUBLICATIONS

Alexander, D. H. et al. "Fast Model-Based Estimation of Ancestry in Unrelated Individuals." Genome Research, vol. 19, Jul. 31, 2009, pp. 1655-1664.

Allende, C. et al. "Treelink: Data Integration, Clustering and Visualization of Phylogenetic Trees." BMC Bioinformatics, vol. 16, Dec. 2015, pp. 3-6.

Ball, C. A. et al. "AncestryDNA Matching White Paper: Discovering Genetic Matches Across a Massive, Expanding Genetic Database." AncestryDNA, Mar. 31, 2016, pp. 1-46.

Baran, Y. et al. "Fast and Accurate Inference of Local Ancestry in Latino Populations." Bioinformatics, vol. 28, No. 10, May 2012, pp. 1359-1367.

Bastian, M. et al. "Gephi: An Open Source Software for Exploring and Manipulating Networks." Proceedings of the Third International AAAI Conference on Weblogs and Social Media, vol. 3, No. 1, Mar. 19, 2009, pp. 361-362.

Bercovici, S. et al. "Ancestry Inference in Complex Admixtures via Variable-Length Markov Chain Linkage Models." Proceedings of the 16th Annual International Conference on Research in Computational Molecular Biology, Apr. 2012, pp. 12-28.

Bettinger, B., "Clustering Shared Matches," The Genetic Genealogist, Jan. 3, 2017, 16 pages, [online] [Retrieved on Sep. 2, 2020] Retrieved from the Internet <URL: https://thegeneticgenealogist.com/2017/01/03/clustering-shared-matches/>.

Brisbin, A. et al. "PCAdmix: Principal Components-Based Assignment of Ancestry along Each Chromosome in Individuals with Admixed Ancestry from Two or More Populations." Human Biology, vol. 84, No. 4, Aug. 2012, pp. 343-364.

Brooks, R. R. et al. "Behavior Detection Using Confidence Intervals of Hidden Markov Models." IEEE Transactions on Systems, Man, and Cybernetics—Part B: Cybernetics, vol. 39, No. 6, Dec. 2009, pp. 1484-1492.

Browning, B. L. et al. "Detecting Identity by Descent and Estimating Genotype Error Rates in Sequence Data." The American Journal of Human Genetics, vol. 93, Nov. 7, 2013, pp. 840-851.

Browning, B. L. et al. "Genotype Imputation with Millions of Reference Samples." The American Journal of Human Genetics, vol. 98, Jan. 7, 2016, pp. 116-126.

Browning, B. L. et al., "Improving the Accuracy and Efficiency of Identity by Descent Detection in Population Data," Genetics, Jun. 2013, pp. 459-471, vol. 194.

Browning, B. L. et al., "A Unified Approach to Genotype Imputation and Haplotype Phase Inference for Large Data sets of Trios and

(56) References Cited

OTHER PUBLICATIONS

Unrelated Individuals," The American Journal of Human Genetics, Feb. 13, 2009, pp. 210-223, vol. 84.
Browning, B.L et al., "Efficient Multilocus Association Testing for Whole Genome Association Studies Using Localized Haplotype Clustering," Genetic Epidemiology, vol. 31, Feb. 26, 2007, pp. 365-375.
Browning, B.L. et al., "A Fast, Powerful Method for Detecting Identity by Descent," The American Journal of Human Genetics, Feb. 11, 2011, vol. 88, No. 2, pp. 173-182.
Browning, S.R. et al., "Haplotype Phasing: Existing Models and New Developments," Nature Reviews Genetics, Oct. 2011, pp. 703-714, vol. 12.
Browning, S.R. et al., "Rapid and Accurate Haplotype Phasing and Missing-Data Inference for Whole-Genome Association Studies by Use of Localized Haplotype Clustering," American Journal of Human Genetics, vol. 81, Nov. 2007, pp. 1084-1096.
Browning, S.R., "Multilocus Association Mapping Using Variable-Length Markov Chains," American Journal of Human Genetics, Apr. 7, 2006, pp. 903-913, vol. 78, No. 6.
Cann, H. M. et al. "A Human Genome Diversity Cell Line Panel." Science, vol. 296, No. 5566, Apr. 12, 2002, pp. 261-262.
Cavalli-Sforza, L. L. "The Human Genome Diversity Project: Past, Present and Future." Nature Reviews Genetics, vol. 6, Apr. 1, 2005, pp. 333-340.
Cooper, K., "More Automated DNA Match Clustering!," Kitty Cooper's Blog, Dec. 30, 2018, 13 pages, [Online] [Retrieved on Nov. 16, 2023] Retrieved from the Internet <URL:https://blog.kittycooper.com/2018/12/more-automated-dna-match-clustering/>.
De Roos, A. P. W. "Genomic Selection in Dairy Cattle." Dissertation, Wageningen University, Jan. 21, 2011, pp. 1-185.
Dilthey, A. et al. "Multi-Population Classical HLA Type Imputation." PLoS Computational Biology, vol. 9, No. 2, Feb. 2013, pp. 1-13.
Dilthey, A. et al. "Multi-Population Classical HLA Type Imputation." Supporting Text S1, PLoS Computational Biology, vol. 9, No. 2, Feb. 2013, pp. 1-17.
DNA Painter, "Convert Autocluster Table to Spreadsheet Format," Dec. 5, 2018, one pages, [Online] [Retrieved on Sep. 2, 2020] Retrieved from the Internet <URL:https://dnapainter.com/tools/convertac>.
Druet, T., et al., "A Hidden Markov Model Combining Linkage and Linkage Disequilibrium Information for Haplotype Reconstruction and Quantitative Trait Locus Fine Mapping," Genetics, Mar. 2010, pp. 789-798, vol. 184, No. 3.
Dudoit, S. et al., "A score test for the linkage analysis of qualitative and quantitative traits based on identity by descent data from sib-pairs," Biostatistics, vol. 1, Iss. 1, Mar. 2000, pp. 1-26.
Durand, E.Y. et al., "Reducing Pervasive False-Positive Identical-by-Descent Segments Detected by Large-Scale Pedigree Analysis," Molecular Biology and Evolution, Apr. 30, 2014, pp. 2212-2222, vol. 31, No. 8.
Durbin, R. M. et al., "A Map of Human Genome Variation from Population-Scale Sequencing," Nature, Oct. 28, 2010, pp. 1061-1073, vol. 467.
Elston, R.C. et al., "A General Model for the Genetic Analysis of Pedigree Data," Human Heredity, 1971, pp. 523-542, vol. 21, No. 6.
Eronen, L. et al. "A Markov Chain Approach to Reconstruction of Long Haplotypes." Pacific Symposium on Biocomputing, Jan. 1, 2004, pp. 1-12.
Falush, D. et al., "Inference of Population Structure Using Multilocus Genotype Data: Linked Loci and Correlated Allele Frequencies," Genetics, vol. 164, Aug. 2003, pp. 1567-1587.
Genetic Affairs, "AutoCluster for Marcos Bradford—DNA account: Weimer Berkeley," Genetic Affairs, Nov. 30, 2018, 4 pages, [Online] [Retrieved on Nov. 16, 2023] Retrieved from the Internet <URL:http://geneticaffairs.com/auto_cluster/examples/autocluster_2nd_3rd.html>.
Ghahramani, Z. "An Introduction to Hidden Markov Models and Bayesian Networks." International Journal of Pattern Recognition and Artificial Intelligence, vol. 15, No. 1, Jun. 2001, pp. 9-42.
Gravel, S. "Population Genetics Models of Local Ancestry." Genetics, vol. 191, No. 2, Jun. 1, 2012, pp. 607-619.
Griffiths, B., "Shared matches—matches who match both my paternal and maternal lines," Not Just the Parrys, Aug. 9, 2017, 5 pages, [Online] [Retrieved on Nov. 16, 2023] Retrieved from the Internet <URL:http://notjusttheparrys.blogspot.com/2017/08/shared-matches-matches-who-match-both.html>.
Guan, Y. "Detecting Structure of Haplotypes and Local Ancestry." Genetics, vol. 196, No. 3, Mar. 1, 2014, pp. 625-642.
Gusev, A. et al., "Whole Population, Genome-wide Mapping of Hidden Relatedness," Genome Research, 2009, pp. 318-326, vol. 19.
Halperin, E. et al. "Haplotype Reconstruction from Genotype Data Using Imperfect Phylogeny." Bioinformatics, vol. 20, No. 12, Aug. 2004, pp. 1842-1849.
Han, E. et al. "Clustering of 770,000 Genomes Reveals Post-Colonial Population Structure of North America." Nature Communications, vol. 8, Feb. 7, 2017, pp. 1-12.
Harvard. "Plink . . . Whole Genome Association Analysis Toolset." Harvard.edu, Sep. 9, 2019, 4 pages, [Online] [Retrieved Jan. 29, 2024], Retrieved from the Internet Archive <URL:https://web.archive.org/web/20190909194835/zzz.bwh.harvard.edu/plink/>.
Hellenthal, G. et al. "A Genetic Atlas of Human Admixture History." Science, vol. 343, No. 6172, Feb. 14, 2014, pp. 747-751.
Hoggart, C. J. et al. "Design and Analysis of Admixture Mapping Studies." The American Journal of Human Genetics, vol. 74, No. 5, May 2004, pp. 965-978.
Horton, R. et al. "Variation Analysis and Gene Annotation of Eight MHC Haplotypes: The MHC Haplotype Project." vol. 60, Jan. 10, 2008, pp. 1-18.
Howie, B. N. et al. "A Flexible and Accurate Genotype Imputation Method for the Next Generation of Genome-Wide Association Studies." PLoS Genetics, vol. 5, No. 6, Jun. 2009, pp. 1-15.
Hug, N. "Surprise: A Python Scikit for Recommender Systems." Surpriselib.com, Overview, Sep. 2019, 6 pages, [Online] [Retrieved Jan. 31, 2024], Retrieved from the Internet <URL:https://surpriselib.com/>.
Itan, Y. et al. "The Origins of Lactase Persistence in Europe." PLoS Computational Biology, vol. 5, No. 8, Aug. 2009, pp. 1-13.
Jarvis, J.P. et al., "Patterns of Ancestry of Natural Selection and Genetic Association with Stature in Western African Pygmies," PLoS Genetics, vol. 8, Iss. 4, Apr. 26, 2012, pp. 1-15.
Joshi, S. et al. "Identifiable Phenotyping using Constrained Non-Negative Matrix Factorization." Proceedings of Machine Learning for Healthcare, vol. 56, Aug. 19-20, 2016, pp. 1-24.
Ke, X. et al. "Singleton SNPs in the Human Genome and Implications for Genome-Wide Association Studies." European Journal of Human Genetics, vol. 16, Jan. 16, 2008, pp. 506-515.
Kenny, E.E. et al., "Increased Power of Mixed Models Facilitates Association Mapping of 10 Loci for Metabolic Traits in an Isolated Population," Human Molecular Genetics, Feb. 15, 2011, pp. 827-839, vol. 20, No. 4.
Khodabandelou, G. et al. "Genome Functional Annotation Across Species Using Deep Convolutional Neural Networks." bio Rxiv: The Preprint Server for Biology, Jun. 7, 2019, pp. 1-11.
Kong, A. et al. "Detection of Sharing by Descent, Long-Range Phasing and Haplotype Imputation," Nature Genetics, Author Manuscript, Sep. 2008, vol. 40, No. 9, pp. 1-22.
Krogh, A. S. "Hidden Markov Models for Labeled Sequences." Proceedings of the $12^{th}$ IAPR International Conference on Pattern Recognition, vol. 3, Oct. 9-13, 1994, pp. 140-144.
Lander, E.S. et al., "Construction of Multilocus Genetic Linkage Maps in Humans," Proc. Nat. Acad. Sci., Apr. 1987, pp. 2363-2367, vol. 84.
Lawson, D. J. et al. "Inference of Population Structure Using Dense Haplotype Data." PLOS Genetics, vol. 8, No. 1, Jan. 2012, pp. 1-16.
Li, H. et al., "Relationship Estimation from Whole-Genome Sequence Data," PLOS Genetics, Jan. 30, 2014, e1004144, pp. 1-12, vol. 10, No. 1.

(56) References Cited

OTHER PUBLICATIONS

Li, J. et al. "Towards Unsupervised Gene Selection: A Matrix Factorization Framework." IEEE/ACM Transactions on Computational Biology and Bioinformatics, vol. 14, No. 3, May-Jun. 2017, pp. 514-521.
Li, N. et al. "Modeling Linkage Disequilibrium and Identifying Recombination Hotspots Using Single-Nucleotide Polymorphism Data." Genetics, vol. 165, No. 4, Dec. 1, 2003, pp. 2213-2233.
Li, Y. et al. "Genotype Imputation." Annual Review of Genomics and Human Genetics, vol. 10, Sep. 2009, pp. 387-406.
Li, Y. et al. "MaCH: Using Sequence and Genotype Data to Estimate Haplotypes and Unobserved Genotypes." Genetic Epidemiology, vol. 34, No. 8, Dec. 2010, pp. 816-834.
Li, Y. et al., "Haplotype Reconstruction in Large Pedigrees with Untyped Individuals through IBD reference," Journal of Computational Biology, Nov. 2011, vol. 18, No. 11, pp. 1411-1421.
Liu, E. Y. et al. "MaCH-Admix: Genotype Imputation for Admixed Populations." Genetic Epidemiology, vol. 37, No. 1, Jan. 2013, pp. 25-37.
Livne, O.E. et al., "PRIMAL: Fast and Accurate Pedigree-based Imputation from sequence data in a Founder Population," PLOS Computational Biology, Mar. 3, 2015, vol. 11, No. 3, pp. 1-14.
Loh, P-R. et al. "Inferring Admixture Histories of Human Populations Using Linkage Disequilibrium." Genetics, vol. 193, No. 4, Apr. 1, 2013, pp. 1233-1254.
Lu, C. et al. "A Normalized Statistical Metric Space for Hidden Markov Models." IEEE Transactions on Cybernetics, vol. 43, No. 3, Jun. 2013, pp. 806-819.
Ma, P. et al. "Comparison of Different Methods for Imputing Genome-Wide Marker Genotypes in Swedish and Finnish Red Cattle." Journal of Dairy Science, vol. 96, No. 7, Jul. 2013, pp. 4666-4677.
Ma, Y. et al. "Accurate Inference of Local Phased Ancestry of Modern Admixed Populations." Scientific Reports, vol. 4, Jul. 23, 2014, pp. 1-5.
Maples, B. K. et al. "RFMix: A Discriminative Modeling Approach for Rapid and Robust Local-Ancestry Inference." The American Journal of Human Genetics, vol. 93, Aug. 8, 2013, pp. 278-288.
Mcpeek, M. S. et al. "Assessment of Linkage Disequilibrium by the Decay of Haplotype Sharing, with Application to Fine-Scale Genetic Mapping." American Journal of Human Genetics, vol. 65, No. 3, Sep. 1, 1999, pp. 858-875.
Meuwissen, T. et al., "The Use of Family Relationships and Linkage Disequilibrium to Impute Phase and Missing Genotypes in Up to Whole Genome Sequence Density Genotypic Data," Genetics, Aug. 2010, pp. 1441-1449, vol. 185.
Montesinos-López, O. A. et al. "Prediction of Multiple-Trait and Multiple-Environment Genomic Data Using Recommender Systems." G3 Genes/Genomes/Genetics, vol. 8, No. 1, Jan. 1, 2018, pp. 131-147.
Moreno-Estrada, A. et al. "Reconstructing the Population Genetic History of the Caribbean." PLoS Genetics, vol. 9, No. 11, Nov. 2013, pp. 1-19.
Morrison, A.C. et al., "Prediction of Coronary Heart Disease Risk using a Genetic Risk Score: The Atherosclerosis Risk in Communities Study," American Journal of Epidemiology, vol. 166, No. 1, Apr. 18, 2007, pp. 28-35.
Noto, K. et al. "Polly: A Novel Approach for Estimating Local and Global Admixture Proportion Based on Rich Haplotype Models." ASHG 2015 Abstracts, Abstract 322, The American Society of Human Genetics 65th Annual Meeting, Oct. 6-10, 2015, pp. 1-2.
Noto, K. et al. "Polly: A Novel Approach for Estimating Local and Global Admixture Proportion Based on Rich Haplotype Models." Invited Talk at the American Society of Human Genetics (ASHG) Annual Meeting, Baltimore, MD, Oct. 6-10, 2015, pp. 1-6.
Noto, K. et al. "Underdog: A Fully-Supervised Phasing Algorithm that Learns from Hundreds of Thousands of Samples and Phases in Minutes." ASHG 2014 Abstracts, Abstract 155, The American Society of Human Genetics 64th Annual Meeting, Oct. 18-22, 2014, pp. 1-2.
Ott, J., "Estimation of the Recombination Fraction in Human Pedigrees: Efficient Computation of the Likelihood for Human Linkage Studies," American Journal of Human Genetics, 1974, pp. 588-597, vol. 26, No. 5.
Palin, K. et al., "Identity-by-Descent-Based Phasing and Imputation in Founder Populations Using Graphical Models," Genetic Epidemiology, vol. 35, Oct. 17, 2011, pp. 853-860.
Paşniuc, B. et al. "Imputation-Based Local Ancestry Inference in Admixed Populations." International Symposium on Bioinformatics Research and Applications, May 13-16, 2009, pp. 1-13.
Paşniuc, B. et al. "Inference of Locus-Specific Ancestry in Closely Related Populations." Bioinformatics, vol. 25, No. 12, Jun. 2009, pp. i213-i221.
Patterson, N. et al. "Population Structure and Eigenanalysis." PLoS Genetics, vol. 2, No. 12, Dec. 2006, pp. 2074-2093.
Peck, R. et al. "Introduction to Statistics and Data Analysis." Section 7.4, 3rd Edition, Nov. 11, 2008, pp. 372-377.
Peck, R. et al. "Introduction to Statistics and Data Analysis." Sections 9.2-9.3, 3rd Edition, Nov. 11, 2008, pp. 482-508.
Platt, J.C., "Probabilistic Outputs for Support Vector Machines and Comparisons to Regularized Likelihood Methods," Mar. 26, 1999, pp. 1-11.
Price, A.L. et al., "Sensitive Detection of Chromosomal Segments of Distinct Ancestry in Admixed Populations," PLoS Genetics, vol. 5, Iss. 6, Jun. 2009, pp. 1-18.
Pritchard, J. K. et al. "Inference of Population Structure Using Multilocus Genotype Data." Genetics, vol. 155, No. 2, Jun. 1, 2000, pp. 945-959.
Purcell, S. et al., "Plink: A tool set for whole-genome association and population-based linkage analyses," The American Journal of Human Genetics, vol. 81, Sep. 2007, pp. 559-575.
Qian, Y. et al., "Efficient clustering of identity-by-descent between multiple individuals," Bioinformatics, vol. 30, No. 7, Dec. 19, 2013, pp. 915-922.
Rabiner, L.R., "A Tutorial on Hidden Markov Models and Selected Applications in Speech Recognition," Proceedings of the IEEE, vol. 77, No. 2, Feb. 1989, pp. 257-286.
Ramstetter, M. D. et al., "Inferring Identical-by-Descent Sharing of Sample Ancestors Promotes High-Resolution Relative Detection," The American Journal of Human Genetics, vol. 103, Jul. 5, 2018, pp. 30-44.
Ranciaro, A. et al. "Genetic Origins of Lactase Persistence and the Spread of Pastoralism in Africa." The American Journal of Human Genetics, vol. 94, Apr. 3, 2014, pp. 496-510.
Roach, J. C. et al. "Analysis of Genetic Inheritance in a Family Quartet by Whole-Genome Sequencing." Science, vol. 328, No. 5978, Apr. 30, 2010, pp. 636-639.
Rocchi, M., et al., "Ancestral genomes reconstruction: An integrated, multi-disciplinary approach is needed," Genome Research, Oct. 2006, pp. 1441-1444, vol. 16, No. 12.
Ron, D. et al., "On the Learnability and Usage of Acyclic Probabilistic Finite Automata," Journal of Computer and System Sciences, vol. 56, 1998, pp. 133-152.
Sankararaman, S. et al. "Estimating Local Ancestry in Admixed Populations." The American Journal of Human Genetics, vol. 82, Feb. 2008, pp. 290-303.
Scheet, P. et al., "A Fast and Flexible Statistical Model for Large-Scale Population Genotype Data: Applications to Inferring Missing Genotypes and Haplotypic Phase," The American Journal of Human Genetics, vol. 78, Feb. 17, 2006, pp. 629-644.
Seligsohn, U. et al., "Genetic Susceptibility to Venous Thrombosis," The New England Journal of Medicine, vol. 344, No. 16, Apr. 19, 2001, pp. 1222-1231.
Silva, M. C. F. et al. "Development of Two Multiplex Mini-Sequencing Panels of Ancestry Informative SNPs for Studies in Latin Americans: An Application to Populations of the State of Minas Gerais (Brazil)." Genetics and Molecular Research, vol. 9, No. 4, Oct. 19, 2010, pp. 2069-2085.
Speed, D. et al., "Relatedness in the post-genomic era: is it still useful?" Nature Reviews Genetics, Jan. 2015, vol. 16, No. 1, pp. 33-45.

(56) References Cited

OTHER PUBLICATIONS

Staples, J. et al., “Primus: Rapid Reconstruction of Pedigrees from Genome-wide Estimates of Identity by Descent,” The American Journal of Human Genetics, vol. 95, Nov. 6, 2014, pp. 553-564.
Stephens, M. et al. “Accounting for Decay of Linkage Disequilibrium in Haplotype Inference and Missing-Data Imputation.” The American Journal of Human Genetics, vol. 76, No. 3, Mar. 2005, pp. 449-462.
Sturm, R. A. et al. “A Single SNP in an Evolutionary Conserved Region within Intron 86 of the HERC2 Gene Determines Human Blue-Brown Eye Color.” The American Journal of Human Genetics, vol. 82, Feb. 2008, pp. 424-431.
Sundquist, A. et al., “Effect of Genetic Divergence in Identifying Ancestral Origin using HAPAA,” Genome Res., vol. 18, Mar. 18, 2008, pp. 676-682.
Tang, H. et al. “Reconstructing Genetic Ancestry Blocks in Admixed Individuals.” The American Journal of Human Genetics, vol. 79, Jul. 2006, pp. 1-12.
Ter Braak, C. J. F. et al. “Identity-by-Descent Matrix Decomposition Using Latent Ancestral Allele Models.” Genetics, vol. 185, No. 3, Jul. 1, 2010, pp. 1045-1057.
The 1000 Genomes Project Consortium. “A Global Reference for Human Genetic Variation.” Nature, vol. 526, No. 7571, Oct. 1, 2015, pp. 68-74.
The International Hapmap 3 Consortium, “Integrating common and rare genetic variation in diverse human populations,” Nature, vol. 467, Sep. 2, 2010, pp. 52-58.
The International Hapmap Consortium. “A Second Generation Human Haplotype Map of Over 3.1 Million SNPs.” Nature, Author Manuscript, Oct. 18, 2007, vol. 449, No. 7164, pp. 1-30.
The International Hapmap Consortium. “A Haplotype Map of the Human Genome.” Nature, vol. 437, Oct. 27, 2005, pp. 1299-1320.
Thompson, E. A. “Statistical Inference from Genetic Data on Pedigrees,” NSF-CBMS Regional Conference Series in Probability and Statistics, 2000, 186 pages, vol. 6.
Thompson, E.A., “Identity by Descent: Variation in Meiosis, Across Genomes, and in Populations,” Genetics, Jun. 2013, pp. 301-326, vol. 194.
Tipping, M.E., “Sparse Bayesian Learning and the Relevance Vector Machine,” Journal of Machine Learning Research, Jun. 2001, pp. 211-244.
Visscher, P.M et al., “Heritability in the genomics era-concepts and misconceptions,” Nature Reviews Genetics, Mar. 4, 2008, pp. 255-266.
Wang, Y. et al. “Ancestry Inference Using Reference Labeled Clusters of Haplotypes.” BMC Bioinformatics, vol. 22, Sep. 25, 2021, pp. 1-14.
Weedon, M.N. et al., “Combining Information from Common Type 2 Diabetes Risk Polymorphisms Improves Disease Prediction,” PLoS Med., vol. 3, Iss. 10, Oct. 2006, pp. 1877-1882.
Welch, B. L., “The Generalization of “Student’s” Problem When Several Different Population Variances are Involved,” Biometrika, Jan. 1947, pp. 28-35, vol. 34, Issue 1-2.
Wikipedia. “Ethnicity.” Wikipedia: The Free Encyclopedia, Jul. 30, 2022, 12 pages, [Online] [Retrieved Sep. 27, 2023], Retrieved from the Internet <URL:https://en.wikipedia.org/wiki/Ethnicity>.
Wikipedia. “Inverse Distance Weighting.” Wikipedia: The Free Encyclopedia, Dec. 6, 2023, 4 pages, [Online] [Retrieved Jan. 30, 2024], Retrieved from the Internet <URL:https://en.wikipedia.org/wiki/Inverse_distance_weighting>.
Williams, A.L. et al., “Phasing of Many Thousands of Genotyped Samples,” American Journal of Human Genetics, Aug. 10, 2012, pp. 238-251, vol. 91, No. 2.
Yang, Q. et al., “Improving the Prediction of Complex Diseases by Testing for Multiple Disease-Susceptibility Genes,” American Journal of Human Genetics, vol. 72, Feb. 14, 2003, pp. 636-649.
Yoon, B-J., “Hidden Markov Models and their Applications in Biological Sequence Analysis,” Current Genomics, vol. 10, Sep. 2009, pp. 402-415.
youtube.com, “Merry DNA Christmas—Family History Fanatics Live,” Family History Fanatics, Dec. 14, 2018, one page, [Online] [Retrieved on Nov. 16, 2023] Retrieved from the Internet <URL: https://www.youtube.com/watch?v=--eruCeJ9_8>.
Zeng, X. et al. “Probability-Based Collaborative Filtering Model for Predicting Gene-Disease Associations.” BMC Medical Genomics, vol. 10, No. 76, Dec. 28, 2017, pp. 45-53.
Zhao, H. et al. “Haplotype Analysis in Population Genetics and Association Studies.” Pharmacogenomics, vol. 4, No. 2, Mar. 1, 2003, pp. 171-178.

* cited by examiner

RECEIVE A TARGET DATA INSTANCE
305

SCAN THROUGH A DATA STORE TO IDENTIFY A RELATED DATA INSTANCE THAT SHARES ONE OR MORE MATCHED DATA STRINGS WITH THE TARGET DATA INSTANCE
310

DETERMINE ONE OR MORE WINDOWS OF DATA LOCALITY TO WHICH THE ONE OR MORE MATCHED DATA STRINGS BELONG
315

DETERMINE ONE OR MORE DATA GROUP LABELS FOR THE ONE OR MORE WINDOWS OF DATA LOCALITY THAT INCLUDE THE ONE OR MORE MATCHED DATA STRINGS
320

STORE DATA GROUP INFORMATION OF THE MATCHED DATA STRINGS BETWEEN THE TARGET DATA INSTANCE AND THE RELATED DATA INSTANCE
325

300

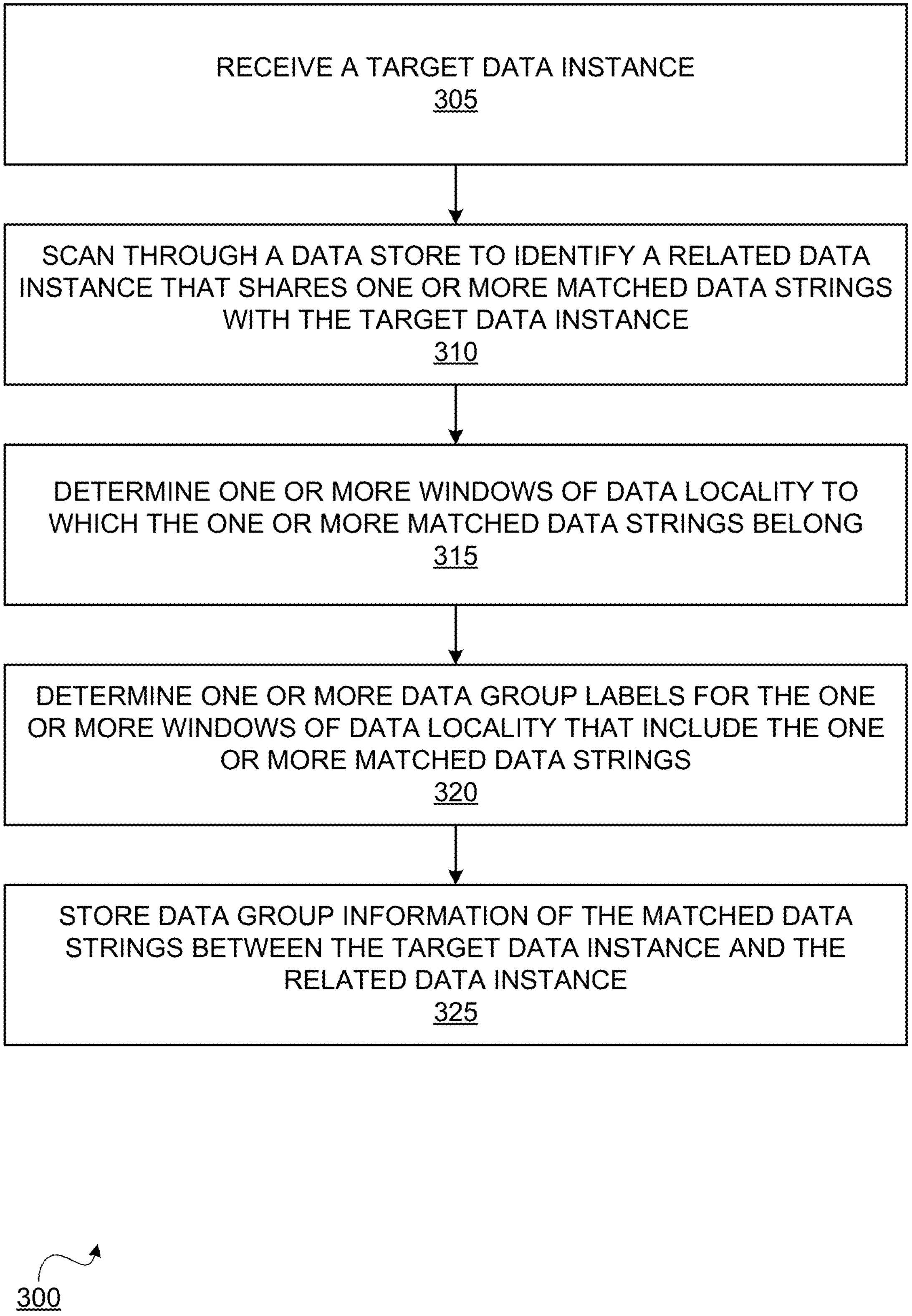

*FIG. 3*

RECEIVE A GENETIC DATASET OF A TARGET INDIVIDUAL
405

SCAN THROUGH A GENETIC DATA STORE TO IDENTIFY ONE OR MORE RELATED INDIVIDUALS WHO SHARE IBD SEGMENTS WITH THE TARGET INDIVIDUAL FOR OVER A THRESHOLD LENGTH
410

DETERMINE ONE OR MORE WINDOWS OF GENOMIC LOCALITY TO WHICH THE ONE OR MORE SHARED IBD SEGMENTS BELONG
415

DETERMINE ONE OR MORE ETHNICITY LABELS FOR THE SHARED IBD SEGMENTS THAT BELONG TO THE ONE OR MORE WINDOWS
420

OUTPUT ETHNICITY INFORMATION OF THE SHARED IBD SEGMENTS BETWEEN THE TARGET INDIVIDUAL AND THE RELATED INDIVIDUAL
425

400

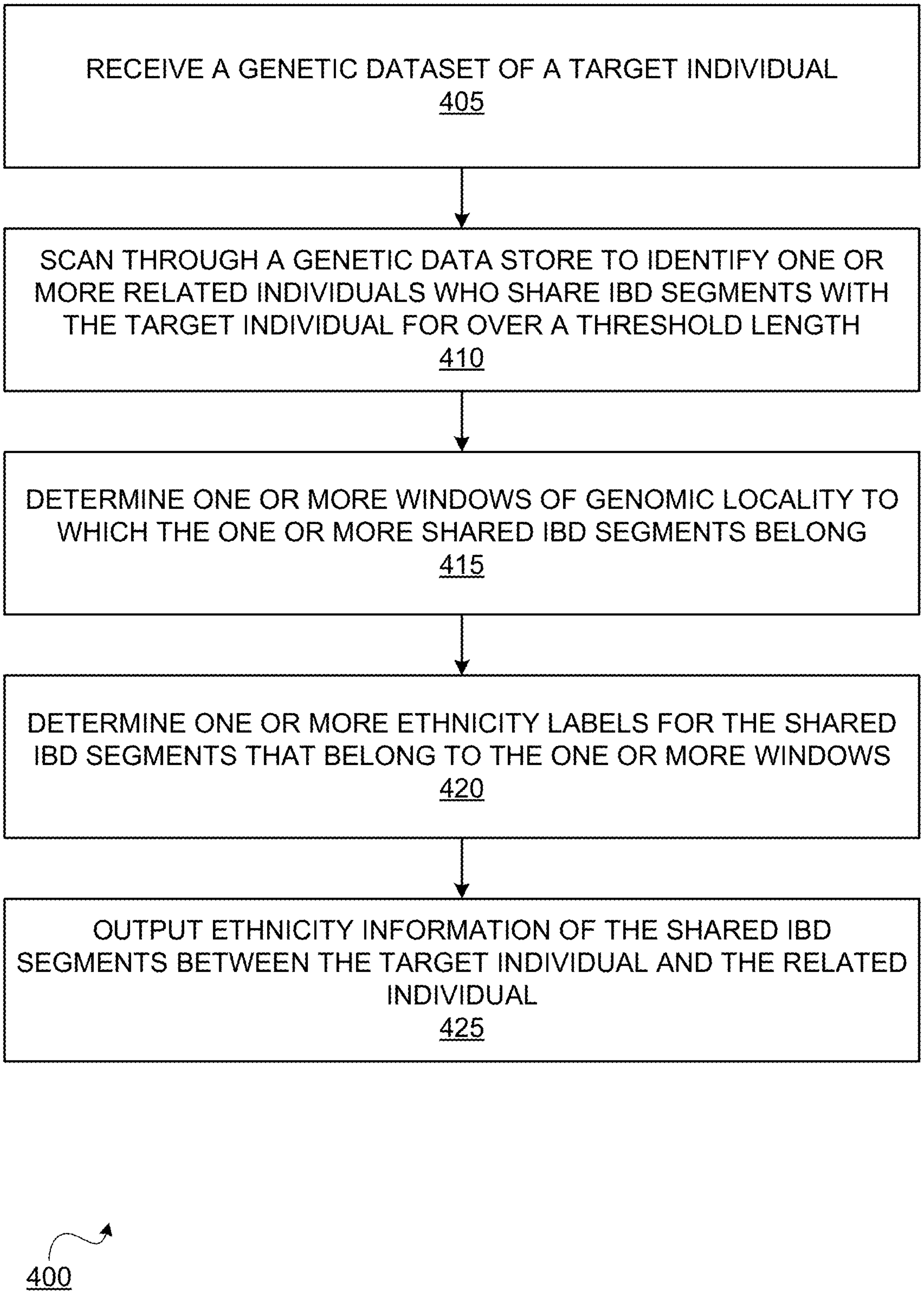

*FIG. 4A*

You and John Doe share a total of 289 cM of shared IBD segments across 14 segments. We estimate that John is your 2nd or 3rd cosuin Trees Ethnicity Shared Matches

SEGMENT-SPECIFIC SHARED DATA INHERITANCE DETERMINATION

CROSS-REFERENCE TO RELATED APPLICATION

The present application claims the benefit of U.S. Provisional Patent Application No. 63/403,300, filed on Sep. 2, 2022, which is hereby incorporated by reference in its entirety.

FIELD

The disclosed embodiments relate to database management and more specifically to identifying data inheritance of data strings that match two or more data instances.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Data may be inherited and evolved based on real-world events that are not always recorded or documented. Yet, while the real-world events may not be completely documented, the change and inheritance of those events may be traceable through the change among data instances. For example, two data instances may be generated independently and individually reflect the status of two events, the natures or characteristics of two apparently unrelated named entities, or any combination of natures. However, the two data instances or corresponding events or named entities may be inherited from one or more common sources so that the two data instances share some similarities in the data.

SUMMARY

Disclosed herein relates to example embodiments that relate to a computer-implemented method, including: receiving a target data instance; scanning through a data store to identify a related data instance that shares one or more matched data strings with the target data instance; determining one or more windows of data locality to which the one or more matched data strings belong; determining one or more data group labels for the one or more windows of data locality that includes the one or more matched data strings; and storing data group information of the matched data strings between the target data instance and the related data instance.

In some embodiments, the target data instance is a pair of phased data sequences.

In some embodiments, the pair of phased data sequences is generated based on comparing the target data instance to over 10,000 other data instances to separate the data bits of the target data instance into two groups of data inheritance.

In some embodiments, the related data instance and the target data instance are related by inheritance of real-life event.

In some embodiments, the one or more windows of data locality correspond to windows in a hidden Markov model and determining the one or more data group labels for the one or more windows of data locality includes using the hidden Markov model to determine the data group labels.

In some embodiments, the computer-implemented method may further include providing an estimate that the target data instance and the related data instance share a common real-life named entity that can be represented by a data instance that has a data group composition derived from the one or more data group labels assigned to the one or more windows to which the one or more matched data strings belong.

In some embodiments, each of the one or more data group labels is assigned to a window of data locality and the data group information includes a composition of the data group labels.

In some embodiments, at least one of the one or more matched data strings is a data string that is identified by a fuzzy match.

In some embodiments, the computer-implemented method may further include determining, for the related data instance and the target data instance, a data inheritance source of the matched data strings in relation to a data tree.

In some embodiments, the computer-implemented method may further include causing to display, at a graphical user interface, a geographical map that illustrates the data group information of the matched data strings.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

Figure (FIG. 1 illustrates a diagram of a system environment of an example computing system, in accordance with some embodiments.

FIG. 3 is a flowchart depicting an example process for determining group inheritance of specific data strings between two data instances, in accordance with some embodiments.

FIG. 4A is a flowchart depicting an example process for determining ethnicity estimation for shared IBD segments between two individuals, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Data may be inherited and evolved based on real-world events that are not always recorded or documented. Yet, while the real-world events may not be completely documented, the change and inheritance of those events may be traceable through comparing data strings among data instances. For example, two data instances may be generated independently and individually reflect the status of two named entities or two events. The data patterns in the data instances may reflect the natures, histories, or characteristics of two apparently unrelated named entities or two apparently unrelated events. In some embodiments, matched data strings of two data instances are identified. The locations of the data strings relative to the entire data instance are identified and data group labels corresponding to the locations and data strings are assigned based on the pattern of the data strings.

Example System Environment

Figure 1:
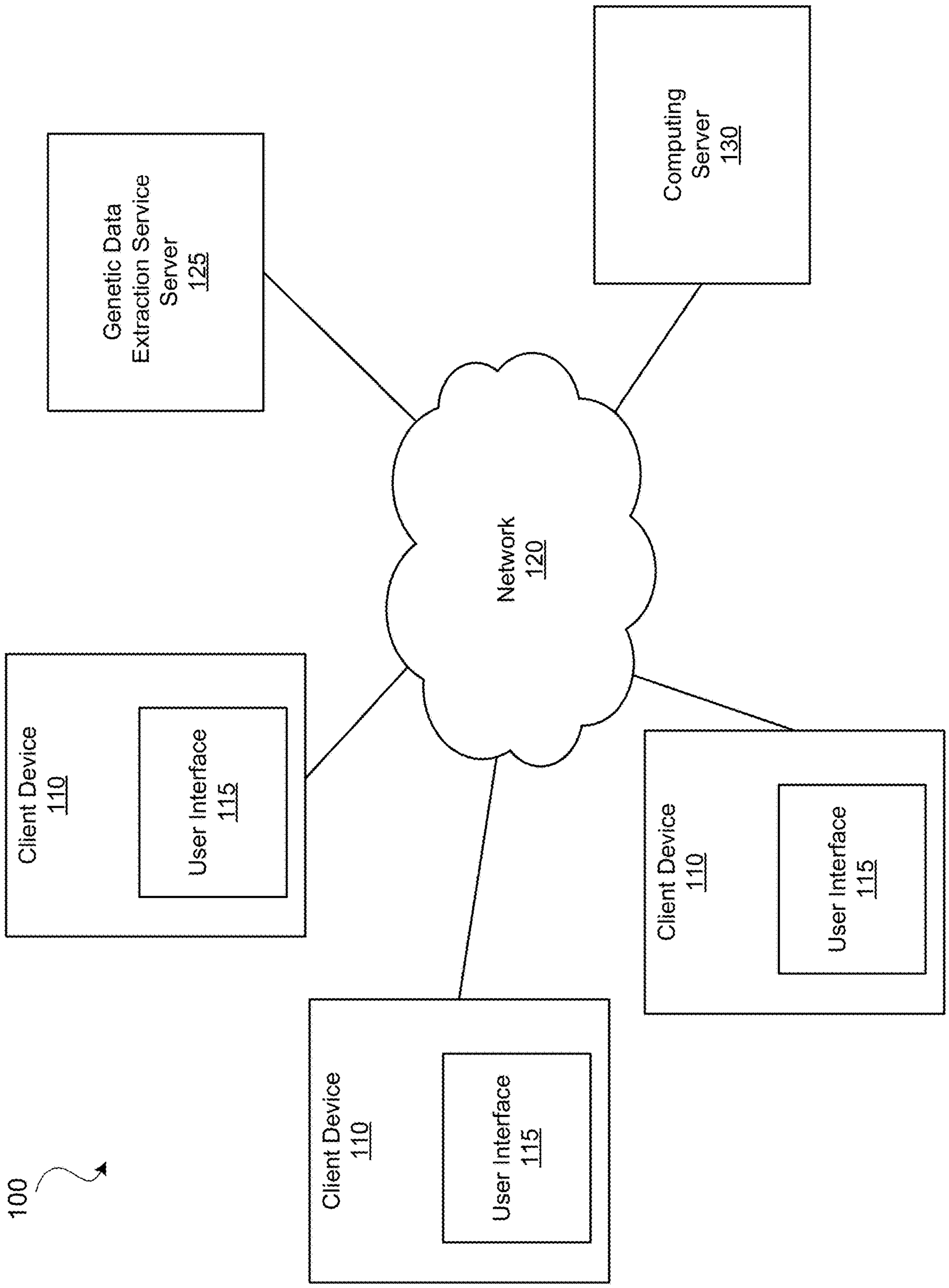

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 4G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet. Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 400,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers. In some embodiments, each SNP site may have two readings that are heterozygous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
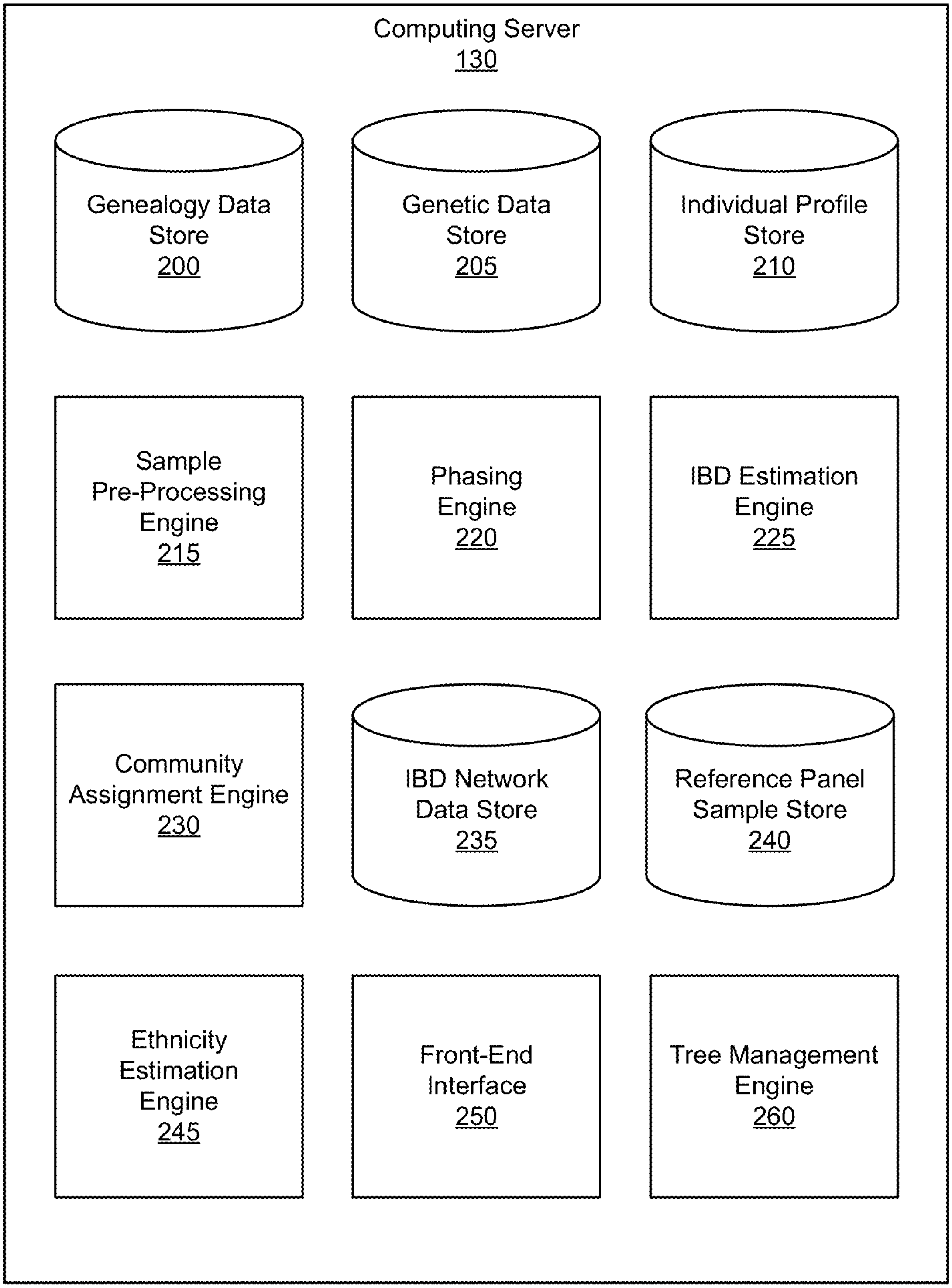
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP sites (e.g., allele sites) filtered from the sequencing results. A SNP site that is single base pair long may also be referred to a SNP locus. A SNP site may be associated with a unique identifier. The genetic dataset may be in a form of diploid data that includes a sequencing of genotypes, such as genotypes at the target SNP site, or the whole base pair sequence that includes genotypes at known SNP site and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

In some embodiments, the individual profile store 210 may be a large-scale data store. In some embodiments, the individual profile store 210 may include at least 10,000 data records in the form of user profiles and each user profile may be associated with one or more genetic datasets and one or more genealogical data entries. In some embodiments, the individual profile store 210 may include at least 50,000 data records in the form of user profiles and each user profile may be associated with one or more genetic datasets and one or more genealogical data entries. In some embodiments, the individual profile store 210 may include at least 100,000 data records in the form of user profiles and each user profile may be associated with one or more genetic datasets and one or more genealogical data entries. In some embodiments, the individual profile store 210 may include at least 500,000 data records in the form of user profiles and each user profile may be associated with one or more genetic datasets and one or more genealogical data entries. In some embodiments, the individual profile store 210 may include at least 1,000,000 data records in the form of user profiles and each user profile may be associated with one or more genetic datasets and one or more genealogical data entries. In some embodiments, the individual profile store 210 may include at least 2,000,000 data records in the form of user profiles and each user profile may be associated with one or more genetic datasets and one or more genealogical data entries. In some embodiments, the individual profile store 210 may include at least 5,000,000 data records in the form of user profiles and each user profile may be associated with one or more genetic datasets and one or more genealogical data entries. In some embodiments, the individual profile store 210 may include at least 10,000,000 data records in the form of user profiles and each user profile may be associated with one or more genetic datasets and one or more genealogical data entries.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 400,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long-distance accuracy in terms of haplotype separation. For example, in some embodiments, a jig phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of sub-cluster pairs of first parental groups and second parental groups. Each sub-cluster pair may be in a window. The window may correspond to a genomic segment and has a similar concept of window used in the ethnicity estimation engine 245 and the rest of the disclosure related to HMMs, but how windows are precisely divided and defined may be the same or different in the phasing engine 220 and in an HMM. Each sub-cluster pair may correspond to a genetic locus. In some embodiments, each sub-cluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of sub-cluster pairs). Generating the super-cluster of the parental side may include generating a candidate parental side assignment of parental groups across a set of sub-cluster pairs that represent a set of genetic loci in the plurality of genetic loci. The computing server 130 may determine a number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 40, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 40% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 400 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled “Local Genetic Ethnicity Determination System,” granted on Feb. 11, 2020 and U.S. Pat. No. 10,692,587, granted on Jun. 23, 2020, entitled “Global Ancestry Determination System” describe different example embodiments of ethnicity estimation.

In some embodiments, instead of the ethnicity labels of an individual, the ethnicity estimation engine 245 may also identify the ethnicity labels of shared IBD segments between two individuals. The detailed process of determining the ethnicity labels of shared IBD segments is further discussed in FIG. 4A through FIG. 5.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user’s data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users’ management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user’s family tree. The tree management engine 260 may automatically search, rank, and suggest individuals for the user conduct manual reviews as the user makes progress in the front-end interface 250 in building the family tree.

As used herein, “pedigree” and “family tree” may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 40, 2022, describes example embodiments of how an individual may be linked to existing family trees.

Example Matched Data Strings Group Determination Process

FIG. 3 is a flowchart depicting an example process 300 for determining group inheritance of specific data strings between two data instances, in accordance with some embodiments. The process 300 may be performed by a computing device, such as computing server 130. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of computing server 130, each step may be performed by a different computing device.

Data may be inherited and evolved based on real-world events that are not always recorded or documented. Yet, while the real-world events may not be completely documented, the change and inheritance of those events may be traceable by comparing data strings among data instances. For example, two data instances may be generated independently and individually reflect the status of their respective named entities or events. The data patterns in the data instances may reflect the natures, histories, or characteristics of two apparently unrelated named entities or events. However, the two data instances or corresponding named entities or events may be inherited from one or more common sources so that the two data instances share some similarities in the data pattern. As such, the nature of inheritance may be revealed by analyzing and comparing the two data instances. Those real-life events that result in shared data strings between two data instances may be referred to as data inheritance events, even though those real-life events, at the time of the occurrence, may not involve data or data generation at all.

In some cases, however, only portions of data strings are inherited from a data inheritance event and the precise locations and extent of the matched data strings between two data instances are not apparent without a complex process to analyze and compare the two data instances. In some cases, the direct comparison between the two data instances would not reveal any significant meanings of data inheritance for various reasons. For example, one reason is that there can be errors and bit flips as data are generated or processed. Also, whether a matched data string is attributable to a data inheritance event or is merely a common string of bits that are present in many unrelated data instances is also challenging to determine by merely directly comparing two data instances. The process 300 provides a solution to identify matched data strings between two data instances by analyzing the data patterns in other data instances and identifying the matched data strings that are significant. For those identified matched data strings, the process 300 may also provide determination as to the data group labels of those matched data strings. A data group label may represent a label of a group that shares similar attributes. The group can be a group of real-life named entities that share similar attributes and the data corresponding to those named entities may belong to the same data group.

In some embodiments, process 300 can include receiving a target data instance (step 305). In some embodiments, the data instance is related to a target named entity such as a target user. The target named entity may be a user of the computing server 130 who has taken a data sampling test to generate data that is related to the target named entity, such as a DNA test through the genetic data extraction service server 125. In such a case, the data instance may be the genetic dataset of the target user stored in the genetic data store 205. However, while genetic data is used as an example of a data instance in process 300, the process 300 can be applied to other types of data, whether the data is related to a named entity, an event, or another suitable representation. For example, the data instance may be an entry of data related to a named entity. A named-entity data instance may be a user or other personal profile stored in individual profile store 210, a genealogy record that records a life event of the named entity and that is stored in genealogy data store 200, a genetic dataset that includes genomic sequences of a natural person and that is stored in genetic data store 205, or another suitable data instance, whether the data instance is genetic or genealogical in nature, dynamically changing or constant, historical or present. In some embodiments, a named-entity data instance may be nested so that the data instance is linked to additional sub-instances or other data instances of different natures. By way of example, in some embodiments, a named-entity data instance may be a user profile of the computing server 130. Within the user profile, the named-entity data instance may include a link to a genetic dataset of the user who has performed a DNA test provided by the genetic data extraction service server 125, a link to a family tree that is built manually by the user or partially or fully automatically by the computing server 130, a link to one or more genealogical records that describes events and other data that are related to the user. In this example, the genetic dataset, the family tree instance, and the genealogical records may also be named-entity data instances that are nested under the user profile.

The data instance may be raw, processed, or phased. For example, in some embodiments, the target data instance may include a pair of phased data sequences. The pair of phased data sequences may be generated based on comparing the target data instance to other data instances to separate the data bits of the target data instance into two groups of data inheritance. Each group of data may be referred to as a phased data sequence. In some embodiments, to determine phasing, the computing server 130 may compare the target instance to over 10 other data instances. In some embodiments, to determine phasing, the computing server 130 may compare the target instance to over 20 other data instances. In some embodiments, to determine phasing, the computing server 130 may compare the target instance to over 50 other data instances. In some embodiments, to determine phasing, the computing server 130 may compare the target instance to over 100 other data instances. In some embodiments, to determine phasing, the computing server 130 may compare the target instance to over 1,000 other data instances. In some embodiments, to determine phasing, the computing server 130 may compare the target instance to over 10,000 other data instances. In some embodiments, to determine phasing, the computing server 130 may compare the target instance to over 100,000 other data instances. In some embodiments, to determine phasing, the computing server 130 may compare the target instance to over 500,000 other data instances. In some embodiments, to determine phasing, the computing server 130 may compare the target instance to over 1,000,000 other data instances. In some embodiments, the phasing may be performed using the phasing engine 220.

In some embodiments, phasing may be carried by a phasing pipeline that generates phasing result that has a long-distance accuracy. For example, in some embodiments, a phasing method that is discussed in U.S. Patent Application Publication No. US 2021/0034647, entitled "Clustering of Matched Segments to Determine Linkage of Dataset in a Database," published on Feb. 4, 2021, is used.

Continuing with reference to FIG. 3, in some embodiments, process 300 can include scanning through a data store to identify a related data instance that shares one or more matched data strings with the target data instance (step 310). In some embodiments, the related data instance may be a data instance that corresponds to a named entity and may also be referred to as a related named entity data instance. While name entities are described using natural persons as examples, in some embodiments, other types of data instances may be analyzed in the process 300. In step 310, the computing server 130 may identify more than one related data instance.

In some embodiments, the data store scanned through by the computing server 130 may be a large-scale data store. For example, the data store may be the genetic data store 205. In some embodiments, the data store may include at least 10,000 data instances. In some embodiments, the data store may include at least 50,000 data instances. In some embodiments, the data store may include at least 100,000 data instances. In some embodiments, the data store may include at least 500,000 data instances. In some embodiments, the data store may include at least 1,000,000 data instances. In some embodiments, the data store may include at least 2,000,000 data instances. In some embodiments, the data store may include at least 5,000,000 data instances. In some embodiments, the data store may include at least 10,000,000 data instances. In some embodiments, scanning through the named-entity data store is a computer process that cannot be performed mentally or using a manual process such as manually looking through the named-entity data instance one by one.

The step of identification of a related data instance may include comparing the data patterns between the target data instance and the related data instance. Before the comparison, the computing server 130 may not know whether the related data instance is actually related to the target data instance or not. Instead, the computing server 130 may identify matched data strings that match between the data instance and a candidate of a related data instance. In carrying out the comparison, in some embodiments, both the target data instance and the related data instance may be phased, such as by the phasing engine 220.

The computing server 130 may determine one or more matched data strings in the target data instance that is shared with a related data instance. The matching may be based on different criteria in various embodiments. In some embodiments, the computing server 130 may apply an exact match standard. In some embodiments, the computing server 130 may apply a fuzzy match standard. In some embodiments, the computing server 130 may tolerate a small degree of mismatch until the mismatch reaches a threshold extent. In some embodiments, the identification of matched data strings applies the same standard as the identification of over-represented data strings. For example, the computing server 130 may allow one or more changes in bits without classifying two data sequences as being different to account for potential data errors. In some embodiments, the data instances may be in the form of a pair of sequences. The computing server 130 may allow a mismatch on one sequence as long as the other sequence is matched. In some embodiments, the computing server 130 may even tolerate a mismatch in both sequences for a threshold number of times. In some embodiments, the data instances may be genetic datasets. The computing server 130 may regard the sequences window in two data instances as matched unless a homozygous mismatch is identified. Any matching that is not an exact match may be referred to as a weak match.

In some embodiments, before determining that a candidate of a related data instance should be the appropriate data instance for further analysis, the computing server 130 may impose one or more criteria to select the right candidate. For example, the computing server 130 may determine the total length of the matched data strings. The determination of the total length may be performed by measuring the length of the matched data strings or another metric that measures the size of the data strings. In some embodiments, the computing server 130 may exclude overrepresented data strings among data instances in the data store in calculating the total length. In some embodiments, only related data instances that have total lengths of matched data strings exceeding a threshold are selected. The threshold may be determined based on the overall distribution of lengths of matched data strings among the data instances in the data store so that only a limited number of data instances are considered related.

Continuing with reference to FIG. 3, in some embodiments, process 300 can include determining one or more windows of data locality to which one or more matched data strings belong (step 315). The computing server 130 may divide a data instance into sections (e.g., data blocks) that may be referred to as windows of data locality or simply windows. The computing server 130 may determine where the matched data strings are located within a data instance. For example, the computing server 130 may determine the locations of the matched data strings within the target data instance and also within the related data instance. For example, a data instance may be divided into a plurality of windows (e.g., about 1000 windows). Each window includes a set of data bits. For a given matched data string, the computing server 130 may determine the window(s) to which the matched data string belongs. For example, the matched data string may fall within a single window. For a longer matched data string, the matched data string may cover more than multiple windows.

Continuing with reference to FIG. 3, in some embodiments, process 300 can include determining one or more data group labels for the one or more windows of data locality that include one or more matched data strings (step 320). In some embodiments, the locations of the matched data strings within a data instance may reveal how the data instance inherits the data strings. For example, in a group of data instances that shares the same data string at a particular location, it is likely that the data instances in the group inherit the data string from the same or similar data inheritance events. The computing server 130 may identify this type of common data pattern based on analyzing a large number of data instances. For example, the computing server 130 may build a machine learning model that is trained using the data instances in the large-scale data store. For each data locality, the computing server 130 may assign a number of possible labels that provide explanations to how data from the particular data locality is inherited. Each label may be referred to as a data group label because there can be a number of data instances that share the same label.

Those data instances in a group may correspond to a group of named entities that share similar attributes.

In some embodiments, each of the data group labels may be assigned to a window of data locality. For a particular data instance such as the target data instance, by dividing the data instance into a number of windows, each window may be assigned to a data group label or a pair of data group labels if the window contains a pair of phased sequences.

In some embodiments, the determination of the data group labels may be performed using a hidden Markov model (HMM) that is trained by other data instances stored in the data store. A directed acyclic graph may represent a trellis of an inter-window HMM. The graph includes a sequence of a plurality of node groups. Each node group, representing a window, includes a plurality of nodes. The nodes represent different possibilities of group labels for the window. A node may be labeled with a group label. For example, a level includes a first node with a first label representing the likelihood that the data string belongs to a first data group and a second node with a second label representing the likelihood that the data string belongs to a second data group. Each level includes multiple nodes so that there are many possible paths to traverse the directed acyclic graph. Using a trained HMM, the target data instance's data group labels may be determined for various windows. As such, the data group labels for those windows that include the one or more matched data strings may be determined.

Continuing with reference to FIG. 3, in some embodiments, process 300 can include storing data group information of the matched data strings between the target data instance and the related data instance (step 325). The data group information may take various forms, such as the most likely data group(s) of the matched data strings, top N data group(s) shown in the matched data strings, or compositions of the data group labels. For example, the computing server 130 may determine that the matched data strings are included in K windows (e.g., 50 windows). The computing server 130 may determine the data group labels for those K windows. The computing server 130 may determine that the most frequently appeared data group label is the most likely data group that corresponds to the matched data strings if one data group label dominates in the K windows. The computing server 130 may also report the top N data group labels or provide the composition of those labels. Based on the data group information, the computing server 130 may provide an estimate that the target named entity and the related named entity share a common data inheritance event, such as sharing a common real-life named entity that can be represented by another data instance that has a data group composition derived in step 320. In some embodiments, the computing server 130 may also cause the graphical user interface to display a geographical map that illustrates the data group information of the matched data strings. In some embodiments, the computing server 130 may also cause an example graphical user interface (e.g., a software user interface that is displayed at an end-user mobile device) that shows the data group information related to the matched data strings between a target named entity and a related named entity.

Example IBD Segments Ethnicity Determination Process

Figure 4B:
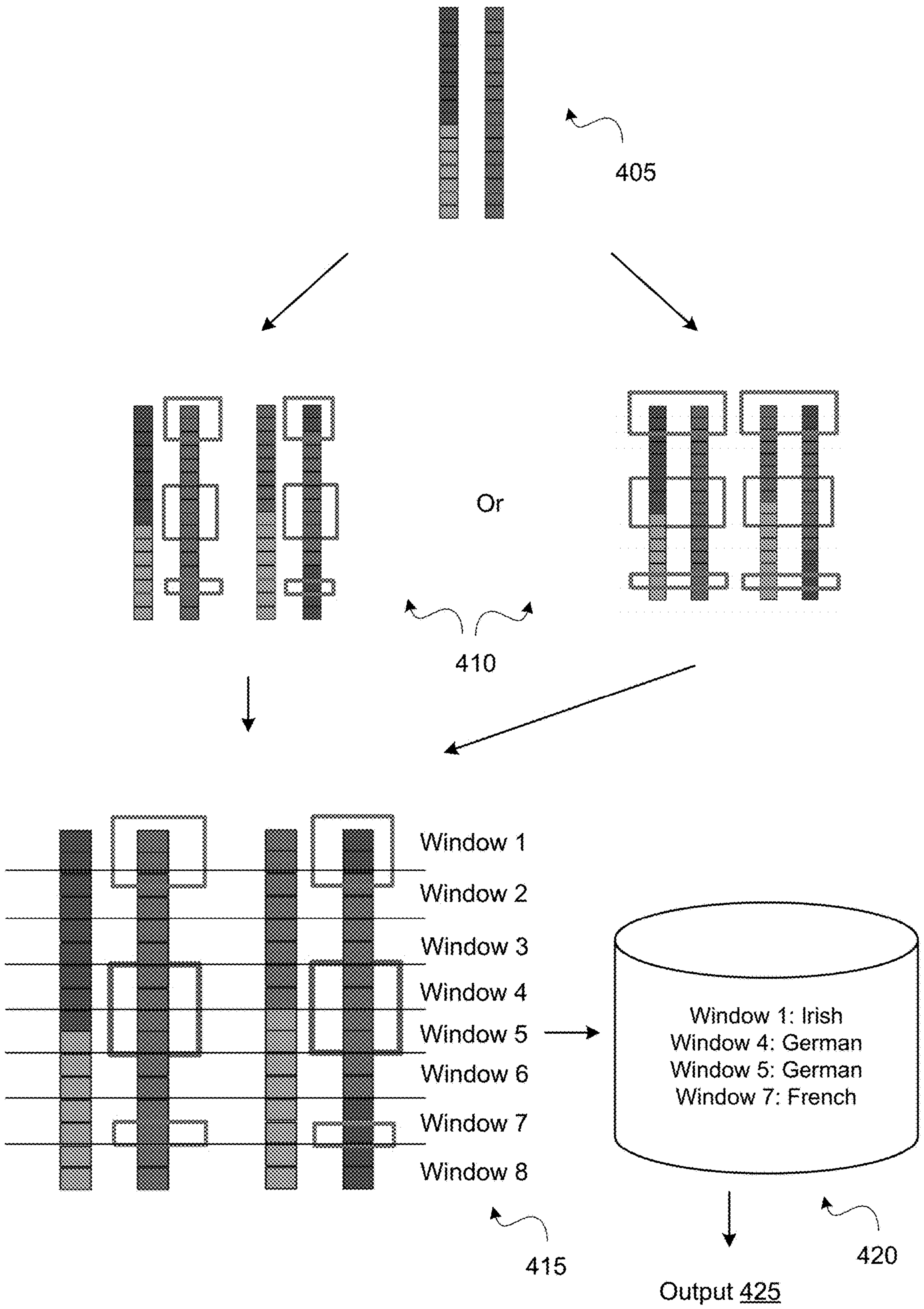
FIG. 4B is a conceptual diagram that graphically illustrates the process for determining ethnicity estimation for shared IBD segments between two individuals, in accordance with some embodiments.

FIG. 4A is a flowchart depicting an example process 400 for determining ethnicity estimation for shared IBD segments between two individuals, in accordance with some embodiments. The process 400 may be an example of an application of the process 300 in the context of analyzing genetic data. FIG. 4B is a conceptual diagram that graphically illustrates the process 400, in accordance with some embodiments. FIG. 4A and FIG. 4B are discussed in conjunction with each other. The process 400 may be performed by a computing device, such as computing server 130. The process 400 may use one or more engines discussed in FIG. 2, such as the sample pre-processing engine 215, the phasing engine 220, the IBD estimation engine 225, and the ethnicity estimation engine 245. The process 400 may be embodied as a software algorithm that may be stored as computer instructions that are executable by one or more processors. The instructions, when executed by the processors, cause the processors to perform various steps in the process 400.

In the context of genetic data, genetic materials may be inherited through various family events that may not be reflected in any known family histories. In the context of genetic data, a genetic data inheritance event may be a family or a reproduction event that is historical and is not documented. The data inheritance event may occur long before humans have the capability of analyzing genetic data. The change and inheritance of genetic materials may be traceable through analyzing the genetic data among various DNA testers or users who provide DNA data to the computing server 130. For example, the genetic data may be genotyped and further separated as a pair of haplotypes. The genetic data pattern may reflect that two individuals are related based on the extent of genetic segments that are identity-by-descent (IBD) between the two individuals. The genetic data may be further separated by windows of genomic locality. If an IBD segment is shared between two individuals, the computing server 130 may determine the window(s) of genomic locality to which the IBD segment belongs. In turn, the computing server 130 may apply the ethnicity estimation engine 245 to determine the ethnicity labels of the IBD segment based on the windows. Using the process 400, the computing server 130 may identify the segments that are shared IBD between two individuals and predict the likely ethnicity groups from which the two individuals inherit the IBD segments.

In the context of genetic data, a target data instance discussed in FIG. 3 may be a genetic dataset of a target individual. A related data instance may be a genetic dataset of a related individual. The data store may be the genetic data store 205. Matched data strings may take the form of shared IBD segments. A window of data locality may be a window of genomic locality. A data group may refer to an ethnicity group and a data group label may refer to an ethnicity label.

With reference to FIGS. 4A and 4B, in some embodiments, the process 400 may include receiving a genetic dataset of a target individual (step 405). The target individual may be a user of the computing server 130 who has taken a DNA test, such as through the genetic data extraction service server 125, or a user who has uploaded his/her genetic data to the computing server 130. The target individual may intend to use the services of the computing server 130 to gain more insight regarding the ethnicity, genetic compositions, and information of his/her relatives. The genetic dataset may be raw, processed, or phased. The discussion of the genetic data extraction service server 125 and the genetic data store 205 provides more examples of the types of genetic datasets that the computing server 130 may receive. In some embodiments, the genetic dataset of the target individual may be genotype data. In some embodiments, the genetic dataset may be a pair of phased haplotypes, such as the data generated by the phasing engine 220.

In some embodiments, both the target genetic dataset and the related genetic dataset are in the form of pairs of phased sequences. In some embodiments, a long-distance phasing algorithm used in the phasing engine 220 may be used to generate, for each genetic dataset, a pair of phased and cross-chromosome haplotypes. In some embodiments, the phasing algorithm may use genetic data of a large number of individuals who share IBD segments with a target individual to provide a long-range cross-chromosome separation of haplotypes with high confidence. This type of phasing algorithm may be referred to as IBD-phasing. A conventional phasing algorithm can only separate haplotypes at a local level. Conventional phasing algorithm provides no confidence of which haplotype is inherited from which parent for sequences that are distanced apart. Conventional phasing algorithms are not able to provide cross-chromosome phasing. For example, haplotypes A and B separated at chromosome pair 1 and haplotypes C and D separated at chromosome pair 2 have no association under conventional phasing algorithms. Conventional phasing algorithms are not able to tell that haplotype A and haplotype C are inherited from the same parent or that haplotype A and haplotype D are inherited from the same parent. In contrast, using the long-distance IBD-phasing method, the computing server 130 may use a large number of relatives that genetically match the individual's genetic data to determine phasing and provide a high confidence of separation even across chromosomes. As such, a pair of cross-chromosome long-range haplotypes with a high confidence that each haplotype is inherited from one parent can be generated.

In some embodiments, to determine phasing using IBD-phasing, the computing server 130 may compare a genetic dataset (whether it is the genetic dataset of the target individual or the related individual) to over 10 other genetic datasets. In some embodiments, to determine phasing, the computing server 130 may compare a genetic dataset to over 20 other genetic datasets. In some embodiments, to determine phasing, the computing server 130 may compare a genetic dataset to over 50 other genetic datasets. In some embodiments, to determine phasing, the computing server 130 may compare a genetic dataset to over 100 other genetic datasets. In some embodiments, to determine phasing, the computing server 130 may compare a genetic dataset to over 1,000 other genetic datasets. In some embodiments, to determine phasing, the computing server 130 may compare a genetic dataset to over 10,000 other genetic datasets. In some embodiments, to determine phasing, the computing server 130 may compare a genetic dataset to over 100,000 other genetic datasets. In some embodiments, to determine phasing, the computing server 130 may compare a genetic dataset to over 500,000 other genetic datasets. In some embodiments, to determine phasing, the computing server 130 may compare a genetic dataset to over 1,000,000 other genetic datasets.

Continuing with reference to FIGS. 4A and 4B, the process 400 may include scanning through a genetic data store to identify one or more related individuals who share IBD segments with the target individual over a threshold length (step 410). A candidate of a related individual may be another DNA tester or otherwise someone whose genetic dataset is available to the computing server 130. The computing server 130 may include genetic datasets of many individuals. The computing server 130 may use the IBD estimation engine 225 to identify candidate related individuals of the target individual. The computing server 130 may examine the genetic data of the two individuals (the target individual and the related individual) to find shared IBD segments, which may be segments that match between the two individuals. The comparison may be based on haploid haplotype data, as shown on the left side of step 410 in FIG. 4B, or based on diploid genotype data, as shown on the right side of step 410 in FIG. 4B.

In some embodiments, the data store scanned through by the computing server 130 may be a large-scale data store, such as the genetic data store 205. In some embodiments, the data store may include at least 10,000 genetic datasets. In some embodiments, the data store may include at least 50,000 genetic datasets. In some embodiments, the data store may include at least 100,000 genetic datasets. In some embodiments, the data store may include at least 500,000 genetic datasets. In some embodiments, the data store may include at least 1,000,000 genetic datasets. In some embodiments, the data store may include at least 2,000,000 genetic datasets. In some embodiments, the data store may include at least 5,000,000 genetic datasets. In some embodiments, the data store may include at least 10,000,000 genetic datasets. In some embodiments, scanning through the genetic data store is a computer process that cannot be performed mentally or using a manual process such as manually looking through the named entity data instance one by one.

In some embodiments, the size of the genetic data store may be over 500 GB. In some embodiments, the size of the genetic data store may be over 1 TB. In some embodiments, the size of the genetic data store may be over 5 TB. In some embodiments, the size of the genetic data store may be over 10 TB. In some embodiments, the size of the genetic data store may be over 20 TB. In some embodiments, the size of the genetic data store may be over 40 TB.

In determining shared IBD segments, the computing server 130 may apply one or more criteria. In some embodiments, the shared segments do not need to be identical matches. The precise determination of what a shared segment is may vary depending on embodiments. In some embodiments, a shared segment may be defined as a segment that is between two homozygous mismatches in the genome for the target individual and the related individual. For example, on one end of the shared segment, the target individual and the related individual may respectively have "TT" and "AA" (thus making a homozygous mismatch and on the other end of the shared segment, the target individual and the related individual may respectively have "GG" and "AA" (another homozygous mismatch). In some embodiments, the computing server 130 may tolerate one or more heterozygous mismatches within the shared segment. In some embodiments, the computing server 130 may require one or more additional conditions for an individual to be classified as a related individual. For example, in some embodiments, the computing server 130 may determine the total length of the shared IBD segments between the target individual and another individual. The other individual may be classified as a related individual if the individual has at least a threshold total length of shared IBD segments with the target individual. The length threshold may be any suitable number that indicates certain significance in relatedness, such as 4 cM, 8 cM, 12 cM, etc.

In some embodiments, in determining shared IBD segments, the phased haplotype data of the target individual may be compared to the phased haplotype data of the related individual. The computing server 130 may determine a parental side of the shared IBD segments for both the target individual and the related individual. Determining the parental side of the shared IBD segments may include determining whether the target individual and the related individual are connected maternally or paternally for the target individual and maternally or paternally for the related individual. For example, both individuals may be connected on the paternal side. In another example, the target individual is connected with the related individual on the maternal side while the related individual is connected on the paternal side. In some embodiments, the computing server 130 may determine the parental side by identifying the side as the first parental side or the second parent side without further determining whether the first parental side (or the second parental side) is the maternal or paternal side. In some embodiments, the parental side determination is with respect to the target individual. In determining the parental side of the shared IBD segments, the computing server 130 may attempt to determine which parental side of the target individual has a common ancestor with the related individual. Likewise, the computing server 130 may attempt to determine which parental side of the related individual has a common ancestor with the target individual.

In various embodiments, the parental side information may be determined in different ways. In some embodiments, the computing server 130 may retrieve family tree information of the related individual or the target individual to determine how the two individuals are related. In some embodiments, the computing server 130 may receive an indication directly from the target individual or the related individual as either or both individuals try to link the other in their profiles or family trees. Other suitable genealogy data may also be used to help the computing server 130 determine the parental side information.

Continuing with reference to FIGS. 4A and 4B, the process 400 may include determining one or more windows of genomic locality to which one or more shared IBD segments belong (step 415). The computing server 130 may determine where the shared IBD segments are located in the genome. In some embodiments, the genome may be divided into sections that may be referred to as windows of genomic locality or simply windows. In some embodiments, the windows may correspond to the windows as discussed in the ethnicity estimation engine 245. As further explained in the discussion associated with the ethnicity estimation engine 245, a genetic dataset may be divided into a plurality of windows (e.g., about 1000 windows). Each window includes a set of SNPs (e.g., 400 SNPs). For a given shared IBD segment, the computing server 130 may determine the window(s) to which the shared IBD segment belongs. For example, the shared IBD segment may fall within a single window. For a longer segment, the segment may cover more than multiple windows.

Continuing with reference to FIGS. 4A and 4B, in some embodiments, process 400 can include determining one or more ethnicity labels for the shared IBD segments that belong to one or more windows (step 420). In some embodiments, each of the ethnicity labels may be a local ethnicity label that is assigned to a window of genomic locality. Local ethnicity labels may refer to ethnicity labels for a specific genomic locality, such as a window. For example, by dividing the genome into a number of windows, each window may be assigned an ethnicity label or a pair of ethnicity labels if the window contains diploid data.

In some embodiments, the determination of the ethnicity labels may be performed using a hidden Markov model (HMM) that is trained by other genetic data stored in the genetic data store 205. A directed acyclic graph may represent a trellis of an inter-window HMM. The ethnicity estimation engine 245 may use an inter-window HMM to determine the ethnic composition of the target genetic dataset. The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph. U.S. Pat. No. 10,558,930, entitled "Local Genetic Ethnicity Determination System," granted on Feb. 11, 2020, describes an example process for determining ethnicity labels for different windows. U.S. Pat. No. 10,692,587, entitled "Global Ancestry Determination System," granted on Jun. 23, 2020, likewise describes embodiments for determining ethnicity labels for different windows.

The computing server 130 may determine one or more ethnicity labels for shared IBD segments that are assigned to one or more windows. For example, each window may contain diploid data, which corresponds to the genomic location of the window for a pair of chromosomes. In some embodiments, each window may have two labels, each for a parental side. The parental side information regarding how the target individual and the related individual are related may be used for the computing server 130 to determine the right label. In some embodiments, the computing server 130 may run the ethnicity estimation engine 245 on the genetic data of the target individual and the related individual and determine the ethnicity labels for windows that include the shared IBD segments. In some embodiments, the ethnicity estimation engine 245 has been run previously and the ethnicity labels are predetermined. The computing server 130 retrieves the ethnicity labels from a data store. In turn, the computing server 130 may select the ethnicity label from the pair of ethnicity labels assigned to a window based on the parental information determined. In some embodiments, for a window within an IBD segment, the ethnicity algorithm could generate different most likely ethnicity estimates for the target individual and the related individual, on the parental sides they are related to each other. In such a case, a computational algorithm may read the posterior probability of all ethnicities for the target individual and the related individual in this window to predict a most likely shared ethnicity. In some embodiments, the shared IBD segments are in diploid format and the ethnicity labels are identified based on the diploid labels. In some embodiments, haplotype data are used to identify shared IBD segments and the IBD segments are in haploid format. The ethnicity labels are identified based on the labels to the identified matched parental side.

Continuing with reference to FIGS. 4A and 4B, in some embodiments, process 400 can include outputting ethnicity information of the shared IBD segments between the target individual and the related individual (step 425). The ethnicity information may take various forms, such as the most likely ethnicity of the shared IBD segments, top N ethnicities shown in the shared IBD segments, or compositions of the ethnicity labels. For example, the computing server 130 may determine that the shared IBD segments are included in K windows (e.g., 50 windows). The computing server 130 may determine the ethnicity labels for those K windows. The computing server 130 may determine that the most frequently appeared ethnicity label is the most likely ethnicity that corresponds to the shared IBD segments if one ethnicity label dominates in the K windows. The computing server 130 may also report the top N ethnicity labels or provide the composition of those labels. Based on the ethnicity information, the computing server 130 may provide an estimate that the target individual and the related individual have a common ancestor who has an ethnicity composition derived from the one or more ethnicity labels assigned to the one or more windows to which the one or more shared IBD segments belong. In some embodiments, the computing server 130 may also cause the graphical user interface to display a geographical map that illustrates the ethnicity information of the shared IBD segments.

Figure 5:
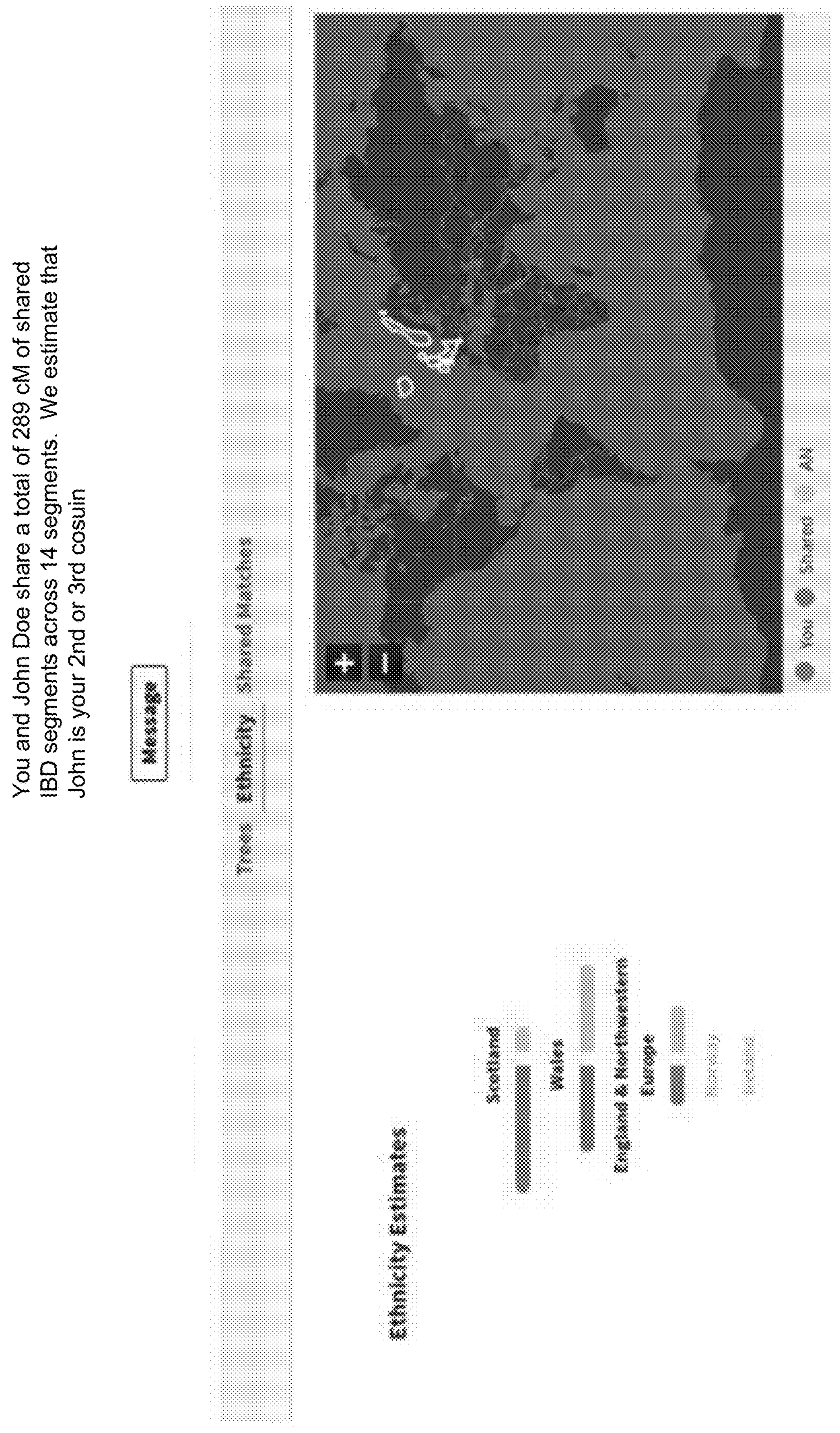
FIG. 5 is a conceptual diagram illustrating an example graphical user interface that shows the ethnicity information related to the shared IBD segments between a target individual and a related individual.

FIG. 5 is a conceptual diagram illustrating an example graphical user interface that shows the ethnicity information related to the shared IBD segments between a target individual and a related individual. The computing server 130 may provide a genealogy research system to end users. The genealogy research system may take the form of a web browser interface, a mobile application, or another software platform. The end user may be the target individual who has his/her genetic dataset stored in the genetic data store 205. In some cases, the end user may identify a potentially related individual, such as through genealogy research and/or browsing various family trees provided by the computing server 130 to identify the potentially related individual, such as in connection with using the features provided by the tree management engine 260. In some cases, the potentially related individual may be suggested by the computing server 130. For example, the computing server 130 may scan through the genetic data store 205 to identify related individuals of the user. After a related individual is identified, the user may select the individual and the computing server 130 may perform the process 400 to determine the ethnicity estimates of the shared IBD segments between the user and the related individual. The computing server 130 may cause a graphical user interface to display the ethnicity information of the shared IBD segments between the target individual and the related individual. The computing server 130 may also cause the graphical user interface to show a geographical map that represents the ethnicity labels found in the shared IBD segments between the two individuals. In some embodiments, the computing server 130 may also cause the graphical user interface to display the total length of shared IBD segments (e.g., in cM), the total number of shared IBD segments, and the estimated familial relationship between the target individual and the related individual. The estimated familial relationship may be based on the total length of shared IBD segments without a family tree that links the two individuals together.

Computing Machine Architecture

Figure 6:
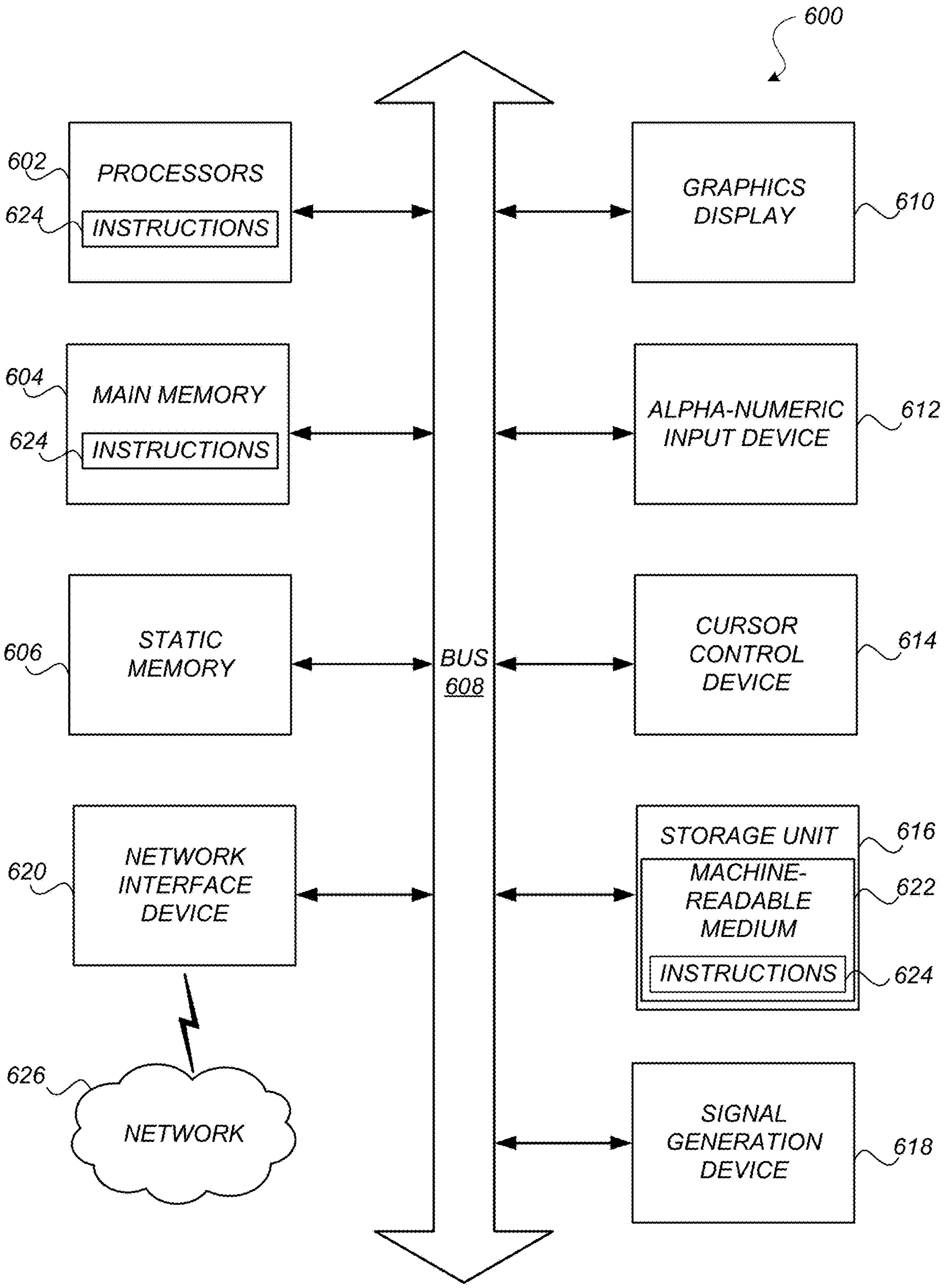
FIG. 6 is a block diagram of an example computing device, in accordance with some embodiments.

FIG. 6 is a block diagram illustrating components of an example computing machine that is capable of reading instructions from a computer-readable medium and executing them in a processor (or controller). A computer described herein may include a single computing machine shown in FIG. 6, a virtual machine, a distributed computing system that includes multiple nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIGS. 1 and 2, including but not limited to, the client device 110, the computing server 130, and various engines, interfaces, terminals, and machines shown in FIG. 2. While FIG. 6 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 may also include a memory 604 that store computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 602 and reduces the space required for the memory 604. For example, the database processing techniques described herein reduce the complexity of the computation of the processors 602 by applying one or more novel techniques that simplify the steps in training, reaching convergence, and generating results of the processors 602. The algorithms described herein also reduces the size of the models and datasets to reduce the storage space requirement for memory 604.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situations such as in multiple processors of a system in a chip, in Cloud computing, or in distributed computing.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alphanumeric input device 612 (e.g., a keyboard), a cursor control device 614 (e.g., a mouse, a trackball, a joystick, a motion sensor, or other pointing instruments), a storage unit 616 (a hard drive, a solid-state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

EXAMPLE EMBODIMENTS

Embodiment 1

A computer-implemented method, comprising: receiving a genetic dataset of a target individual; scanning through a large-scale data store to determine one or more related individuals who share identity-by-descent (IBD) segments with the target individual for over a threshold; determining, for a related individual and the target individual, a parental side of the shared IBD segments for both the target individual and the related individual; determining one or more windows of genomic locality to which the one or more shared IBD segments belong; determining one or more ethnicity labels for the shared IBD segments that belong to the one or more windows; and outputting ethnicity information of the shared IBD segments between the target individual and the related individual.

Embodiment 2

The computer-implemented method of Embodiment 1, wherein the genetic dataset of the target individual is a pair of phased haplotypes.

Embodiment 4

The computer-implemented method of Embodiment 1, wherein determining the parental side of the shared IBD segments comprises determining whether the target individual and the related individual are connected maternally or paternally.

Embodiment 4

The computer-implemented method of Embodiment 1, wherein the one or more windows of genomic locality are divided windows in the genetic dataset, and each of the shared IBD segments belongs to one or more of the divided windows.

Embodiment 5

The computer-implemented method of Embodiment 1, wherein the one or more ethnicity labels that are assigned to the one or more windows to which the one or more shared IBD segments belong are determined using a hidden Markov model.

Embodiment 6

The computer-implemented method of Embodiment 1, further comprising providing an estimate that the target individual and the related individual have a common ancestor who has an ethnicity composition derived from the one or more ethnicity labels assigned to the one or more windows to which the one or more shared IBD segments belong.

Embodiment 7

The computer-implemented method of Embodiment 1, wherein each of the one or more ethnicity labels is a local ethnicity label that is assigned to a window of genomic locality.

Embodiment 8

The computer-implemented method of Embodiment 1, wherein at least one of the one or more shared IBD segments is a segment that is between two homozygous mismatches between the target individual and the related individual.

Embodiment 9

The computer-implemented method of Embodiment 1, wherein determining, for the related individual and the target individual, the parental side of the shared IBD segments for both the target individual and the related individual comprises phasing the shared IBD segments.

Embodiment 10

The computer-implemented method of Embodiment 1, further comprising causing to display, at a graphical user interface, a geographical map that illustrates the ethnicity information of the shared IBD segments.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 40, 2018, (6) U.S. Pat. No. 11,429,615, entitled "Linking Individual Datasets to a Database," granted on Aug. 40, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
- receiving a target genetic dataset of a target individual;
- scanning through a genetic data store comprising over 10,000 genetic data instances to identify one or more related individuals who share one or more identity-by-descent (IBD) segments with the target individual, each shared IBD segment having a length that satisfies a threshold length measured in centimorgans (cM);
- determining, for the one or more shared IBD segments, one or more windows of genomic locality to which the one or more shared IBD segments belong; and
- determining one or more ethnicity labels for each shared IBD segment of the one or more shared IBD segments based on the one or more windows of genomic locality, wherein determining the one or more ethnicity labels comprises:

for each window of genomic locality of the one or more windows of genomic locality, computing an emission probability for each candidate ethnicity label;

representing an inter-window hidden Markov model (HMM) as a directed acyclic graph comprising node groups corresponding to respective windows of genomic locality, each node in a node group representing a candidate ethnicity label and an associated likelihood derived from the emission probabilities, and edges between node groups representing transition probabilities between candidate ethnicity labels for adjacent windows of genomic locality; and selecting, from the directed acyclic graph, a sequence of candidate ethnicity labels across the one or more windows of genomic locality using a dynamic programming algorithm; and storing the one or more ethnicity labels of the shared IBD segments between the target individual and the related individual, each of the ethnicity labels being a local ethnicity label that is assigned to a window of genomic locality.

2. The computer-implemented method of claim 1, wherein the target genetic dataset is a pair of phased haplotype sequences.

3. The computer-implemented method of claim 2, wherein the pair of phased haplotype sequences is generated based on comparing the target genetic dataset to over 10,000 other genetic datasets to separate data bits of the target genetic dataset into two groups of data inheritance.

4. The computer-implemented method of claim 1, wherein the one or more windows of genomic locality correspond to windows in the inter-window hidden Markov model (HMM) and determining the one or more ethnicity labels for the one or more windows of genomic locality comprises using the inter-window hidden Markov model (HMM) to determine the ethnicity labels.

5. The computer-implemented method of claim 1, further comprising providing an estimate that the target genetic dataset and a related genetic dataset share a common ancestor that can be represented by a data instance that has an ethnicity composition derived from the one or more ethnicity labels assigned to the one or more windows to which the one or more shared IBD segments belong.

6. The computer-implemented method of claim 1, wherein each of the one or more ethnicity labels is assigned to a window of genomic locality and ethnicity information comprises a composition of the ethnicity labels.

7. The computer-implemented method of claim 1, wherein at least one of the one or more shared IBD segments is a data string that is identified by a fuzzy match.

8. The computer-implemented method of claim 1, further comprising determining, for a related genetic dataset and the target genetic dataset, a data inheritance source of the shared IBD segments in relation to a family tree.

9. The computer-implemented method of claim 1, further comprising causing to display, at a graphical user interface, a geographical map that illustrates ethnicity information of the shared IBD segments.

10. A system, comprising:

a computing server comprising memory and one or more processors, the memory configured to store code comprising instructions, wherein the instructions, when executed by the one or more processors, cause the one or more processors to perform steps comprising:

receiving a target genetic dataset of a target individual;

scanning through a genetic data store comprising over 10,000 genetic data instances to identify one or more related individuals who share one or more identity-by-descent (IBD) segments with the target individual, each shared IBD segment having a length that satisfies a threshold length measured in centimorgans (cM);

determining, for the one or more shared IBD segments, one or more windows of genomic locality to which the one or more shared IBD segments belong;

determining one or more ethnicity labels for each shared IBD segment of the one or more shared IBD segments based on the one or more windows of genomic locality, wherein determining the one or more ethnicity labels comprises:

for each window of genomic locality of the one or more windows of genomic locality, computing an emission probability for each candidate ethnicity label;

representing an inter-window hidden Markov model (HMM) as a directed acyclic graph comprising node groups corresponding to respective windows of genomic locality, each node in a node group representing a candidate ethnicity label and an associated likelihood derived from the emission probabilities, and edges between node groups representing transition probabilities between candidate ethnicity labels for adjacent windows of genomic locality; and selecting, from the directed acyclic graph, a sequence of candidate ethnicity labels across the one or more windows of genomic locality using a dynamic programming algorithm; and storing the one or more ethnicity labels of the shared IBD segments between the target individual and the related individual, each of the ethnicity labels being a local ethnicity label that is assigned to a window of genomic locality; and a graphical user interface in communication with the computing server, the graphical user interface configured to display the one or more ethnicity labels of the shared IBD segments between the target individual and the related individual.

11. The system of claim 10, wherein the target genetic dataset is a pair of phased haplotype sequences.

12. The system of claim 11, wherein the pair of phased haplotype sequences is generated based on comparing the target genetic dataset to over 10,000 other genetic datasets to separate data bits of the target genetic dataset into two groups of data inheritance.

13. The system of claim 10, wherein the one or more windows of genomic locality correspond to windows in the inter-window hidden Markov model (HMM) and determining the one or more ethnicity labels for the one or more windows of genomic locality comprises using the inter-window hidden Markov model (HMM) to determine the ethnicity labels.

14. The system of claim 10, wherein the steps further comprise providing an estimate that the target genetic dataset and a related genetic dataset share a common ancestor that can be represented by a data instance that has an ethnicity composition derived from the one or more ethnicity labels assigned to the one or more windows to which the one or more shared IBD segments belong.

15. The system of claim 10, wherein each of the one or more ethnicity labels is assigned to a window of genomic locality and ethnicity information comprises a composition of the ethnicity labels.

16. The system of claim 10, wherein at least one of the one or more shared IBD segments is a data string that is identified by a fuzzy match.

17. The system of claim 10, wherein the graphical user interface is further configured to display a geographical map that illustrates ethnicity information of the shared IBD segments.

18. A non-transitory computer readable medium configured to store code comprising instructions, wherein the instructions, when executed by one or more processors, cause the one or more processors to perform steps comprising:

receiving a target genetic dataset of a target individual;

scanning through a genetic data store comprising over 10,000 genetic data instances to identify one or more related individuals who share one or more identity-by-descent (IBD) segments with the target individual, each shared IBD segment having a length that satisfies a threshold length measured in centimorgans (cM);

determining, for the one or more shared IBD segments, one or more windows of genomic locality to which the one or more shared IBD segments belong; and determining one or more ethnicity labels for each shared IBD segment of the one or more shared IBD segments based on the one or more windows of genomic locality, wherein determining the one or more ethnicity labels comprises:

for each window of genomic locality of the one or more windows of genomic locality, computing an emission probability for each candidate ethnicity label;

representing an inter-window hidden Markov model (HMM) as a directed acyclic graph comprising node groups corresponding to respective windows of genomic locality, each node in a node group representing a candidate ethnicity label and an associated likelihood derived from the emission probabilities, and edges between node groups representing transition probabilities between candidate ethnicity labels for adjacent windows of genomic locality; and selecting, from the directed acyclic graph, a sequence of candidate ethnicity labels across the one or more windows of genomic locality using a dynamic programming algorithm; and storing the one or more ethnicity labels of the shared IBD segments between the target individual and the related individual, each of the ethnicity labels being a local ethnicity label that is assigned to a window of genomic locality.

19. The non-transitory computer readable medium of claim 18, wherein the target genetic dataset is a pair of phased haplotype sequences.

20. The non-transitory computer readable medium of claim 19, wherein the pair of phased haplotype sequences is generated based on comparing the target genetic dataset to over 10,000 other genomic datasets to separate data bits of the target genetic dataset into two groups of data inheritance.

* * * * *